United States Patent
Sasaki et al.

(10) Patent No.: US 8,350,582 B2
(45) Date of Patent: Jan. 8, 2013

(54) FLUID SENSOR, REFRIGERANT LEAKAGE DETECTION DEVICE, REFRIGERATION SYSTEM, AND REFRIGERANT LEAKAGE DETECTION METHOD

(75) Inventors: Yoshinari Sasaki, Sakai (JP); Takahiro Yamaguchi, Sakai (JP); Tsuyoshi Yonemori, Sakai (JP); Manabu Yoshimi, Sakai (JP); Youyou Xu, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 365 days.

(21) Appl. No.: 12/738,891

(22) PCT Filed: Oct. 22, 2008

(86) PCT No.: PCT/JP2008/002987
§ 371 (c)(1),
(2), (4) Date: Apr. 20, 2010

(87) PCT Pub. No.: WO2009/054126
PCT Pub. Date: Apr. 30, 2009

(65) Prior Publication Data
US 2010/0244863 A1 Sep. 30, 2010

(30) Foreign Application Priority Data

Oct. 23, 2007 (JP) ................. 2007-275537
Jan. 21, 2008 (JP) ................. 2008-010540
Sep. 24, 2008 (JP) ................. 2008-244470

(51) Int. Cl.
*G01R 27/08* (2006.01)
(52) U.S. Cl. .................................................. 324/694
(58) Field of Classification Search ............... None
See application file for complete search history.

(56) References Cited

U.S. PATENT DOCUMENTS

| | | | |
|---|---|---|---|
| 6,170,318 B1 * | 1/2001 | Lewis | 340/632 |
| 6,509,553 B2 * | 1/2003 | Golan et al. | 73/204.11 |
| 6,772,598 B1 * | 8/2004 | Rinehart | 340/632 |
| 7,466,147 B2 * | 12/2008 | Stahlmann | 324/685 |
| 2002/0144994 A1 * | 10/2002 | Golan et al. | 219/505 |
| 2003/0214304 A1 * | 11/2003 | Karinka et al. | 324/444 |
| 2008/0238449 A1 * | 10/2008 | Shizu et al. | 324/689 |

FOREIGN PATENT DOCUMENTS

| | | |
|---|---|---|
| JP | 11-218002 A | 8/1999 |
| JP | 2000-180289 A | 6/2000 |
| JP | 2000-230761 A | 8/2000 |
| JP | 2002-357582 A | 12/2002 |
| JP | 2003-254924 A | 9/2003 |
| JP | 2007-163099 A | 6/2007 |
| JP | 2011247574 A * | 12/2011 |

* cited by examiner

*Primary Examiner* — Jermele M Hollington
(74) *Attorney, Agent, or Firm* — Global IP Counselors

(57) ABSTRACT

A fluid sensor for detecting refrigerant leakage from a refrigerant circuit includes a sensor main body having two electrodes spaced apart from each other. The fluid sensor is configured such that the fluid sensor is connectable to an impedance measurement device to measure impedance between the two electrodes.

20 Claims, 23 Drawing Sheets

REFRIGERANT PIPE

FLUID SENSOR, REFRIGERANT LEAKAGE DETECTION DEVICE, REFRIGERATION SYSTEM, AND REFRIGERANT LEAKAGE DETECTION METHOD

CROSS-REFERENCE TO RELATED APPLICATIONS

This U.S. National stage application claims priority under 35 U.S.C. §119(a) to Japanese Patent Application Nos. 2007-275537, filed in Japan on Oct. 23, 2007, 2008-010540, filed in Japan on Jan. 21, 2008, and 2008-244470, filed in Japan on Sep. 24, 2008, the entire contents of which are hereby incorporated herein by reference.

TECHNICAL FIELD

The present invention relates to a fluid sensor, and particularly relates to a fluid sensor and refrigerant leakage detection device for detecting refrigerant leakage from a refrigerant circuit of a refrigeration system. The present invention also relates to a refrigeration system comprising a fluid sensor and a refrigerant leakage detection device, and to a refrigerant leakage detection method that uses a fluid sensor.

BACKGROUND ART

In one example of a method for detecting refrigerant leakage from a refrigerant circuit of a refrigeration system, a refrigerant quantity charged in a refrigerant circuit is calculated from various operative state quantities, and refrigerant leakage is detected from this calculated refrigerant quantity (See Japanese Laid-open Patent Application No. 2007-163099).

SUMMARY

However, in the method described above, it is difficult to pinpoint the location where refrigerant leakage is occurring.

There is also a demand that in cases in which refrigerant leakage has been detected, the location in the refrigerant circuit where refrigerant leakage is occurring should be pinpointed in order to take the appropriate measures against the refrigerant leakage.

An object of the present invention is to ensure that refrigerant leakage can be detected while pinpointing the location where refrigerant leakage is occurring in a refrigerant circuit of a refrigeration system.

A fluid sensor according to a first aspect of the present invention is a fluid sensor for detecting refrigerant leakage from a refrigerant circuit of a refrigeration system, wherein the fluid sensor comprises a sensor main body having two electrodes spaced apart, and the fluid sensor is configured such that the fluid sensor is capable of being connected to an impedance measurement device for measuring impedance between the two electrodes. The phrase "having two electrodes" herein means having two electrodes that electrically form a pair.

When the sensor main body of the fluid sensor is provided in or in proximity to a portion of the refrigerant circuit where refrigerant leakage detection is performed and impedance between the two electrodes is measured, the effect of the refrigerant or a fluid resulting from refrigerant leakage entering between the two electrodes causes a change in impedance between a case when refrigerant has leaked from the refrigerant circuit and a case when refrigerant has not leaked. With this fluid sensor, it is possible to detect, based on the change in impedance, that refrigerant has leaked from the portion where the sensor main body is provided, i.e., to detect that refrigerant has leaked while pinpointing the location in the refrigerant circuit of the refrigeration system where the refrigerant leakage is occurring. Even if the refrigeration system has already been constructed without a function for detecting refrigerant leakage, if the fluid sensor is custom-installed, refrigerant leakage detection can be enabled by being connected to an impedance measurement device. The phrase "the fluid resulting from refrigerant leakage" herein means refrigerator oil which leaks together with the refrigerant, condensation water formed by refrigerant leakage, or the like.

The fluid sensor according to a second aspect of the present invention is the fluid sensor according to the first aspect, wherein between the two electrodes the sensor main body has a fluid holder for holding a refrigerant or a fluid resulting from refrigerant leakage.

In cases in which the sensor main body of the fluid sensor is configured from only two electrodes, it is difficult to proactively accumulate refrigerant or fluid resulting from refrigerant leakage in between the two electrodes. Therefore, in cases in which the leaked amount is extremely small, for example, situations may arise in which refrigerant leakage cannot be detected.

In view of this, in this fluid sensor, a fluid holder for holding refrigerant or fluid resulting from refrigerant leakage is provided between the two electrodes, and the refrigerant or fluid resulting from refrigerant leakage that enters in between the two electrodes is held and accumulated in the fluid holder. Refrigerant leakage is thereby easily detected and the precision of refrigerant leakage detection can be increased, even if the amount of refrigerant leakage is extremely small.

The fluid sensor according to a third aspect of the present invention is the fluid sensor according to the second aspect, wherein the fluid holder is paper.

In this fluid sensor, refrigerator oil which does not readily evaporate or diffuse can be held and be accumulated by being adsorbed by paper that is the fluid holder even after leakage. Therefore, evidence of refrigerant leakage can be more reliably ascertained than in cases in which refrigerant which readily evaporates or diffuses after leakage is held in the fluid holder, and the precision of refrigerant leakage detection can thereby be increased.

The fluid sensor according to a fourth aspect of the present invention is the fluid sensor according to any of the first through third aspects, wherein the two electrodes in the sensor main body have a multilayered structure.

Since electrodes having a multilayered structure are used in this fluid sensor, the electric capacitance of the sensor main body can be increased, and the precision of refrigerant leakage detection can thereby be increased.

The fluid sensor according to a fifth aspect of the present invention is the fluid sensor according to any of the first through fourth aspects, wherein the sensor main body has a structure which can be mounted so as to surround a pipe or pipe joint constituting the refrigerant circuit.

In this fluid sensor, since the refrigerant or the fluid resulting from refrigerant leakage can be effectively caused to enter in between the two electrodes, evidence of refrigerant leakage can be reliably ascertained, and the precision of refrigerant leakage detection can thereby be increased.

The fluid sensor according to a sixth aspect of the present invention is the fluid sensor according to the fifth aspect, wherein the sensor main body is provided with a latching part for detachably latching to the pipe or pipe joint constituting the refrigerant circuit.

In this fluid sensor, since the sensor main body can be detachably latched to the pipe or pipe joint by the latching part, the operation of attaching and removing the sensor main body is made easier.

The fluid sensor according to a seventh aspect of the present invention is the fluid sensor according to any of the first through fourth aspects, wherein the sensor main body has a flat plate-shaped structure.

In this fluid sensor, since the sensor main body is compact and easily handled, the sensor main body can be easily attached in or in proximity to the portion where refrigerant leakage detection is performed.

The fluid sensor according to an eighth aspect of the present invention is the fluid sensor according to any of the second through sixth aspects, wherein the fluid holder and the electrodes are covered by a casing constituting the sensor main body; and a fluid-guiding member whereby a refrigerant or a fluid resulting from refrigerant leakage is led between the two electrodes is provided to the sensor main body so as to protrude from the casing interior to the casing exterior.

In this fluid sensor, in cases in which refrigerant leakage detection is performed based on the change in impedance caused by a specified fluid among either the refrigerant or fluids resulting from refrigerant leakage, fluids and the like other than the refrigerant and the specified fluid resulting from refrigerant leakage can be prevented to the fullest extent possible from being held in the fluid holder by covering the fluid holder and the electrodes with the casing, and the refrigerant or the specified fluid resulting from refrigerant leakage can be led into the casing and held and accumulated in the fluid holder by providing a fluid-guiding member for leading the refrigerant or a fluid resulting from refrigerant leakage in between the two electrodes so as to protrude from the casing interior to the casing exterior. This can contribute to improving the precision of refrigerant leakage detection.

The fluid sensor according to a ninth aspect of the present invention is the fluid sensor according to the eighth aspect, wherein openings for allowing the fluid-guiding member to protrude from the casing interior to the casing exterior are formed in the casing, and the openings have a smaller opening size than accommodating parts covering the fluid holder and the electrodes.

In this fluid sensor, making the opening size of the openings for allowing the fluid-guiding member to protrude from the casing interior to the casing exterior smaller than the accommodating parts covering the fluid holder and the electrodes makes it possible to prevent fluids and the like other than the refrigerant and the specified fluid resulting from refrigerant leakage from entering through the accommodating parts.

The fluid sensor according to a tenth aspect of the present invention is the fluid sensor according to the ninth aspect, wherein gaps between the openings and the fluid-guiding member are filled with a sealant in a state in which the fluid-guiding member protrudes from the openings.

In this fluid sensor, providing a sealant for filling in the gaps between the openings and the fluid-guiding member in a state in which the fluid-guiding member protrudes from the openings can contribute to preventing fluids and the like other than the refrigerant and the specified fluid resulting from refrigerant leakage from entering through the accommodating parts.

A refrigeration system according to an eleventh aspect of the present invention comprises a refrigerant circuit and the fluid sensor according to any of the first through tenth aspects, the fluid sensor being disposed in or in proximity to a portion in the refrigerant circuit where refrigerant leakage is detected.

With this refrigeration system, since the fluid sensor is provided in or in proximity to a portion in the refrigerant circuit where refrigerant leakage detection is performed, connecting an impedance measurement device to the fluid sensor when refrigerant leakage detection is performed makes it possible to detect that refrigerant has leaked from the portion where the sensor main body is provided, i.e., to detect that refrigerant has leaked while pinpointing the location in the refrigerant circuit of the refrigeration system where the refrigerant leakage is occurring.

The refrigeration system according to a twelfth aspect of the present invention is the refrigeration system according to the eleventh aspect, further comprising an impedance measurement device connected to the fluid sensor.

Since this refrigeration system further comprises the impedance measurement device connected to the fluid sensor, there is no longer a need to connect the impedance measurement device to the fluid sensor when refrigerant leakage detection is performed. It is also possible to contribute to improving the precision of refrigerant leakage detection because a process for storing the results of refrigerant leakage detection and the like can be easily performed. It is also possible to constantly perform refrigerant leakage detection.

The fluid sensor according to a thirteenth aspect of the present invention is a fluid sensor for detecting refrigerant leakage from a refrigerant circuit of a refrigeration system, wherein the fluid sensor comprises a sensor main body having two electrodes spaced apart; and the sensor main body further has an impedance measurement unit for measuring impedance between the two electrodes, a leakage determination unit for determining whether or not refrigerant has leaked based on the impedance value measured by the impedance measurement unit, and a signal output unit for outputting to an external device the result of the refrigerant leakage determination obtained by the leakage determination unit. The phrase "having two electrodes" herein means having two electrodes that electrically form a pair.

When the sensor main body of the fluid sensor is provided in or in proximity to a portion of the refrigerant circuit where refrigerant leakage detection is performed and impedance between the two electrodes is measured, the effect of the refrigerant or a fluid resulting from refrigerant leakage entering between the two electrodes causes a change in impedance between a case when refrigerant has leaked from the refrigerant circuit and a case when refrigerant has not leaked. With this fluid sensor, it is possible to detect, based on the change in impedance, that refrigerant has leaked from the portion where the sensor main body is provided, i.e., to detect that refrigerant has leaked while pinpointing the location in the refrigerant circuit of the refrigeration system where the refrigerant leakage is occurring. Moreover, with this fluid sensor, since the sensor main body has the impedance measurement unit for measuring impedance between the two electrodes, a leakage determination unit for concluding whether or not refrigerant has leaked, and the leakage determination unit for outputting to an external device the conclusion result pertaining to refrigerant leakage, there is no longer a need to connect an impedance measurement device to the fluid sensor when refrigerant leakage detection is performed. The distance between the electrodes and the impedance measurement unit is also shorter than in cases of connecting to an external impedance measurement device or cases of providing an impedance measurement device to the refrigeration system, which therefore contributes to improving the precision of refrigerant leakage detection. Furthermore, since the leakage determination unit and the signal output unit are also provided, even if the refrigeration system has already been installed without a function for detecting refrigerant leakage, refrigerant leakage detection can be enabled merely by custom installing the fluid sensor. The phrase "the fluid resulting from refrigerant leakage" herein means refrigerator oil which leaks together with the refrigerant, condensation water formed by refrigerant leakage, or the like.

A refrigerant leakage detection device according to a fourteenth aspect of the present invention comprises a first sensor, which is the fluid sensor according to any of the first through tenth aspects, a second sensor, a calculation unit, and a detection unit. The second sensor has two electrodes spaced apart, and the second sensor is configured so that refrigerant or a fluid resulting from refrigerant leakage is not held between the two electrodes. The calculation unit calculates, based on a first difference between the output of the first sensor and the output of the second sensor, a change in electrostatic capacitance caused by the refrigerant or the fluid resulting from refrigerant leakage. The detection unit determines whether or not refrigerant has leaked based on the change in electrostatic capacitance calculated by the calculation unit.

Besides the refrigerant or the fluid resulting from refrigerant leakage, other possible causes for changes in the impedance (or electrostatic capacitance) of the fluid sensor include humidity (i.e., water vapor), temperature, and changes over time. Therefore, if only one such fluid sensor is provided in or in proximity to each portion in the refrigerant circuit where refrigerant leakage detection is performed, there is a possibility that there will also be effects from causes of changes in electrostatic capacitance based on causes of changes in electrostatic capacitance other than the refrigerant or the fluid resulting from refrigerant leakage. In view of this, the refrigerant leakage detection device is configured having two fluid sensors, which are the first sensor in which the refrigerant or the fluid resulting from refrigerant leakage is held between the two electrodes, and the second sensor in which the refrigerant or the fluid resulting from refrigerant leakage is not held between the two electrodes. Humidity or other causes of changes in electrostatic capacitance thereby act on both the first sensor and the second sensor, but while the refrigerant or the fluid resulting from refrigerant leakage as a cause of a change in electrostatic capacitance does not act on the second sensor, the refrigerant or the fluid resulting from refrigerant leakage as a cause of a change in electrostatic capacitance does act on the first sensor. The calculation unit calculates the change in electrostatic capacitance caused by the refrigerant or the fluid resulting from refrigerant leakage from the first difference between the sensor outputs, and the detection unit detects refrigerant leakage from the change in electrostatic capacitance. Specifically, with the first sensor and the second sensor, the refrigerant leakage detection device can offset the amount of change in electrostatic capacitance based on humidity or another cause of a change in electrostatic capacitance, and can calculate the amount of change in electrostatic capacitance alone based on the refrigerant or the fluid resulting from refrigerant leakage. It is thereby possible to accurately know whether or not refrigerant leakage has occurred, based solely on the amount of change in electrostatic capacitance of the first sensor based on the refrigerant or the fluid resulting from refrigerant leakage.

The refrigerant leakage detection device according to a fifteenth aspect of the present invention is the refrigerant leakage detection device according to the fourteenth aspect, further comprising a first oscillation unit which oscillates at a frequency corresponding to the electrostatic capacitance of the first sensor, a second oscillation unit which oscillates at a frequency corresponding to the electrostatic capacitance of the second sensor, and an up/down counter which counts up the output of the first oscillation unit and counts down the output of the second oscillation unit. The calculation unit calculates the first difference on the basis of the values counted by the up/down counter.

In this refrigerant leakage detection device, the up/down counter counts up a signal oscillating according to the electrostatic capacitance of the first sensor, and counts down a signal oscillating according to the electrostatic capacitance of the second sensor. Since the values counted by the up/down counter are numbers of pulses equivalent to the difference between a frequency corresponding to the electrostatic capacitance of the first sensor and a frequency corresponding to the electrostatic capacitance of the second sensor, the first difference can be calculated from the counted values. By calculating the change in electrostatic capacitance on the basis of the first difference calculated in this manner, it is possible to accurately single out the change in electrostatic capacitance caused by the refrigerant or the fluid resulting from refrigerant leakage. Consequently, refrigerant leakage can be detected with greater accuracy.

The refrigerant leakage detection device according to a sixteenth aspect of the present invention is the refrigerant leakage detection device according to the fifteenth aspect, further comprising a selection unit. The selection unit selects either the output of the first oscillation unit or the output of the second oscillation unit. Either the output of the first oscillation unit or the output of the second oscillation unit selected by the selection unit is inputted to the up/down counter.

In this refrigerant leakage detection device, either the output of the first oscillation unit or the output of the second oscillation unit is inputted to the up/down counter. In other words, the output of the first oscillation unit and the output of the second oscillation unit are not inputted to the up/down counter simultaneously. Consequently, the up/down counter is capable of reliably performing the operation of counting up the output of the first oscillation unit and counting down the output of the second oscillation unit, and is also capable of obtaining accurate counted values for calculating the first difference.

The refrigerant leakage detection device according to a seventeenth aspect of the present invention is the refrigerant leakage detection device according to the fifteenth or sixteenth aspect, further comprising a resetting unit for resetting the counted values of the up/down counter in every predetermined cycle.

In this refrigerant leakage detection device, the calculation unit can calculate the first difference between the output of the first sensor and the output of the second sensor from the counted values before resetting.

The refrigerant leakage detection device according to an eighteenth aspect of the present invention is the refrigerant leakage detection device according to the fourteenth aspect, further comprising a first resetting unit for outputting a first reset signal based on a time constant determined by the electrostatic capacitance of the first sensor, a second resetting unit for outputting a second reset signal based on a time constant determined by the electrostatic capacitance of the second sensor, a first counting unit for counting a pulse signal having a predetermined frequency and stopping the counting of the pulse signal on the basis of the first reset signal, a second counting unit for counting the pulse signal and stopping the counting of the pulse signal on the basis of the second reset signal, and a difference calculation unit for calculating a second difference between counted numbers counted by each of the first counting unit and the second counting unit until counting of the pulse signal is stopped. The calculation unit calculates the first difference on the basis of the second difference.

In this refrigerant leakage detection device, the first counting unit counts the pulse signal until resetting is instructed by the first reset signal, and the second counting unit counts the pulse signal until resetting is instructed by the second reset signal. The first reset signal and the second reset signal herein are, respectively, a signal based on a time constant determined by the electrostatic capacitance of the first sensor, and a signal based on a time constant determined by the electrostatic capacitance of the second sensor; therefore, the first counting unit and the second counting unit stop counting at different timings. Specifically, the difference in counted numbers between each of the counting units is equivalent to the difference in electrostatic capacitance between each of the sensors. In view of this, in this refrigerant leakage detection device, the first difference can be derived from the second difference between each of the counted numbers. Consequently, it is possible to accurately single out the change in electrostatic capacitance caused by the refrigerant or the fluid resulting from refrigerant leakage, and refrigerant leakage can be detected with greater precision.

The refrigerant leakage detection device according to a nineteenth aspect of the present invention is the refrigerant leakage detection device according to the fourteenth aspect, further comprising a first timer unit for outputting a first time duration elapse signal indicating that a time duration determined according to the electrostatic capacitance of the first sensor has elapsed, a second timer unit for outputting a second time duration elapse signal indicating that a time duration determined according to the electrostatic capacitance of the second sensor has elapsed, and an interval calculation unit for calculating the length of time during which either the first time duration elapse signal or the second time duration elapse signal is outputted from the first timer unit or the second timer unit. The calculation unit calculates the first difference on the basis of the length of time calculated by the interval calculation unit.

When the electrostatic capacitances of each of the sensors differ, the time duration determined according to the electrostatic capacitance of the first sensor and the time duration determined according to the electrostatic capacitance of the second sensor are different, and the first and second time duration elapse signals indicating that each of the time durations have elapsed therefore begin to be outputted with different timings. In view of this, in this refrigerant leakage detection device, the first difference is calculated based on the length of time during which either the first time duration elapse signal or the second time duration elapse signal indicating the elapse of a time duration is outputted, i.e., based on the difference between the timing with which the first time duration elapse signal begins to be outputted and the timing with which the second time duration elapse signal begins to be outputted. Specifically, since the above-described length of time is equivalent to the change in electrostatic capacitance caused by the refrigerant or the fluid resulting from refrigerant leakage, it is possible to accurately single out the change in electrostatic capacitance caused by the refrigerant or the fluid resulting from refrigerant leakage, and refrigerant leakage can be detected with greater precision.

The refrigeration system according to a twentieth aspect of the present invention comprises a refrigerant circuit and the refrigerant leakage detection device according to any of the fourteenth through nineteenth aspects, the refrigerant leakage detection device being disposed in or in proximity to a portion in the refrigerant circuit where refrigerant leakage detection is performed.

In this refrigeration system, refrigerant leakage detection in the refrigerant circuit is performed by the refrigerant leakage detection device according to any of the fourteenth through nineteenth aspects. Consequently, the same effects as those of the fourteenth through nineteenth aspects can be obtained.

A refrigerant leakage detection method according to a twenty-first aspect of the present invention is a refrigerant leakage detection method for detecting refrigerant leakage from a refrigerant circuit of a refrigeration system, wherein a fluid sensor comprising a sensor main body having two electrodes spaced apart is disposed in or in proximity to a portion in the refrigerant circuit where refrigerant leakage detection is performed, and impedance between the two electrodes is measured by an impedance measurement device. The phrase "having two electrodes" herein means having two electrodes that electrically form a pair.

In this refrigerant leakage detection device, when an impedance measurement device is connected to the fluid sensor provided in or in proximity to a portion of the refrigerant circuit where refrigerant leakage detection is performed and impedance between the two electrodes is measured, the effect of the refrigerant or a fluid resulting from refrigerant leakage entering between the two electrodes causes a change in impedance between a case when refrigerant has leaked from the refrigerant circuit and a case when refrigerant has not leaked. With this refrigerant leakage detection method, it is possible to detect, based on the change in impedance, that refrigerant has leaked from the portion where the sensor main body is provided, i.e., to detect that refrigerant has leaked while pinpointing the location in the refrigerant circuit of the refrigeration system where the refrigerant leakage is occurring. Even if the refrigeration system has already been installed without a function for detecting refrigerant leakage, if the fluid sensor is custom installed, refrigerant leakage detection can be enabled by connecting to an impedance measurement device. The phrase "the fluid resulting from refrigerant leakage" herein means refrigerator oil which leaks together with the refrigerant, condensation water formed by refrigerant leakage, or the like.

DETAILED DESCRIPTION OF EMBODIMENT(S)

Embodiments of a fluid sensor, a refrigerant leakage detection device, a refrigeration system, and a refrigerant leakage detection method according to the present invention are described hereinbelow based on the drawings.

(1) Overall Configuration of Air-Conditioning Apparatus

Figure 1:
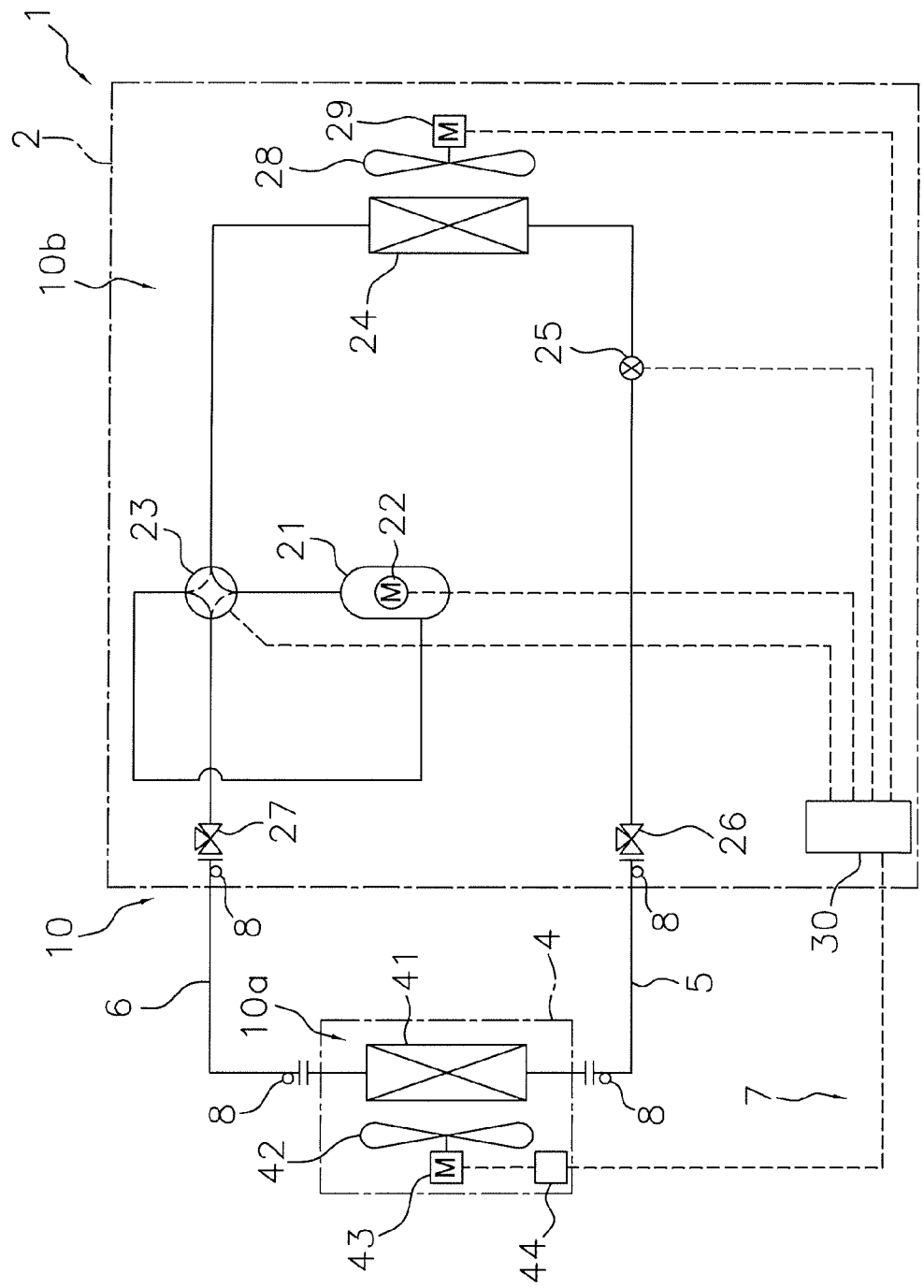
FIG. 1 is a schematic structural diagram of an air-conditioning apparatus as an embodiment of a refrigeration system according to the present invention.

FIG. 1 is a schematic structural diagram of an air-conditioning apparatus 1 as an embodiment of the refrigeration system according to the present invention. The air-conditioning apparatus 1 is a so-called separate-type air-conditioning apparatus, comprising primarily a heat source unit 2, an utilization unit 4, and refrigerant communication pipes 5, 6 for connecting the heat source unit 2 and the utilization unit 4, thus constituting a vapor compression refrigerant circuit 10. Charged within the refrigerant circuit 10 is R12 or another CFC refrigerant, R22 or another HCFC refrigerant, R410A or another HFC refrigerant, propane or another HC refrigerant, carbon dioxide, ammonia, or the like.

<Utilization Unit>

The utilization unit 4 is installed in the back surface of a ceiling, the front surface of a ceiling, a wall surface, or another location in an air-conditioned room, for example, and the utilization unit 4 has an utilization-side refrigerant circuit 10a constituting part of the refrigerant circuit 10. The utilization-side refrigerant circuit 10a has primarily an utilization-side heat exchanger 41.

The utilization-side heat exchanger 41 is a heat exchanger which functions as a refrigerant heater and cools indoor air during a cooling operation, and which functions as a refrigerant cooler and heats indoor air during a heating operation. One end of the utilization-side heat exchanger 41 is connected to the first refrigerant communication pipe 5, and the other end of the utilization-side heat exchanger 41 is connected to the second refrigerant communication pipe 6. The utilization-side heat exchanger 41 can be a fin-and-tube heat exchanger or the like, configured from numerous fins and heat transfer tubes through which refrigerant flows, for example.

In the present embodiment, the utilization unit 4 has an utilization-side fan 42 for drawing indoor air into the unit and supplying the air back into the room after the air has undergone heat exchange and heat exchange can be conducted between the indoor air and the refrigerant flowing through the utilization-side heat exchanger 41. The utilization-side fan 42 is driven by an utilization-side fan motor 43.

The utilization unit 4 also has an utilization-side controller 44 for controlling the operations of the components constituting the utilization unit 4. The utilization-side controller 44 has a microcomputer, memory, and the like provided in order to control the utilization unit 4, and the utilization-side controller 44 can exchange control signals and the like with a remote controller (not shown) for separately operating the utilization unit 4 and can also exchange control signals and the like with the heat source unit 2.

<Heat Source Unit>

The heat source unit 2 is installed outside of the air-conditioned room, for example, and the heat source unit 2 has a heat source-side refrigerant circuit 10b constituting part of the refrigerant circuit 10. The heat source-side refrigerant circuit 10b has primarily a compressor 21, a four-way switching valve 23, a heat source-side heat exchanger 24, an expansion mechanism 25, and first and second shutoff valves 26, 27.

The compressor 21 is a compressor which has the functions of drawing in a low-pressure gas refrigerant, compressing it into a high-pressure gas refrigerant, and then discharging the high-pressure gas refrigerant. In the present embodiment, the compressor 21 is a hermetic compressor in which a compressor motor 22 is installed inside a housing. Also charged within the refrigerant circuit 10 is refrigerator oil for lubricating the interior of the compressor 21.

The four-way switching valve 23 is a valve which functions as a switching mechanism for switching the direction of refrigerant flow. During the cooling operation, in order for the heat source-side heat exchanger 24 to function as a cooler of the refrigerant compressed in the compressor 21 and for the utilization-side heat exchanger 41 to function as a heater of the refrigerant cooled in the heat source-side heat exchanger 24, the four-way switching valve 23 is capable of connecting the discharge side of the compressor 21 and one end of the heat source-side heat exchanger 24 and also of connecting the intake side of the compressor 21 and the second refrigerant communication pipe 6 (i.e., the second shutoff valve 27) (refer to the solid lines of the four-way switching valve 23 in FIG. 1). During the heating operation, in order for the utilization-side heat exchanger 41 to function as a cooler of the refrigerant compressed in the compressor 21 and for the heat source-side heat exchanger 24 to function as a heater of the refrigerant cooled in the utilization-side heat exchanger 41, the four-way switching valve 23 is capable of connecting the discharge side of the compressor 21 and the second refrigerant communication pipe 6 (i.e., the second shutoff valve 27) and also of connecting the intake side of the compressor 21 and one end of the heat source-side heat exchanger 24 (refer to the dashed lines of the four-way switching valve 23 in FIG. 1).

The heat source-side heat exchanger 24 is a heat exchanger which functions as refrigerant cooler using outside air as a heat source during the cooling operation, and which functions as a refrigerant heater using outside air as a heat source during the heating operation. One end of the heat source-side heat exchanger 24 is connected to the four-way switching valve 23, and the other end of the heat source-side heat exchanger 24 is connected to the expansion mechanism 25. The heat source-side heat exchanger 24 can be a fin-and-tube heat exchanger or the like configured from numerous fins and heat transfer tubes through which refrigerant flows, for example.

The expansion mechanism 25 is a mechanism for depressurizing high-pressure refrigerant, and in the present embodiment is an electric expansion valve for depressurizing high-pressure refrigerant during both the cooling operation and the heating operation.

The first and second shutoff valves 26, 27 are valves provided to the ports connecting with external devices and piping (specifically, the first and second refrigerant communication pipes 5, 6). The first shutoff valve 26 is connected to the expansion mechanism 25. The second shutoff valve 27 is connected to the four-way switching valve 23.

In the present embodiment, the heat source unit 2 has a heat source-side fan 28 for drawing outside air into the unit and discharging the air out of the room after the air has undergone heat exchange, and heat exchange can be conducted between the outside air and the refrigerant flowing through the heat source-side heat exchanger 24. The heat source-side fan 28 is driven by a heat source-side fan motor 29.

The heat source unit 2 has a heat source-side controller 30 for controlling the operations of the components constituting the heat source unit 2. The heat source-side controller 30 has a microcomputer, memory, and the like provided in order to control the heat source unit 2, and the heat source-side controller 30 can exchange control signals and the like with the utilization-side controller 44 of the utilization unit 4. Thus, the heat source-side controller 30 and the utilization-side controller 44 together constitute a controller 7 for controlling the operations of the components of the air-conditioning apparatus 1.

(2) Configuration of Fluid Sensor and the Like for Detecting Refrigerant Leakage, and Refrigerant Leakage Detection Method In the refrigerant circuit 10 described above, there is a danger that refrigerant will leak out of the refrigerant circuit 10 from the various devices, pipes, or pipe joints constituting the refrigerant circuit 10. When refrigerant leakage has occurred, it is preferable to pinpoint the location where the refrigerant leakage is occurring in the refrigerant circuit 10 for taking the appropriate measures to deal with the refrigerant leakage.

Figure 2:
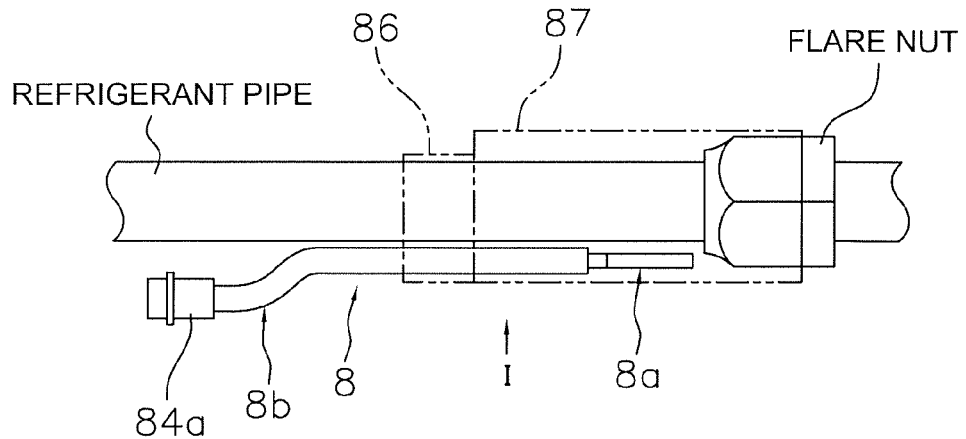
FIG. 2 is a drawing showing a state in which a fluid sensor has been provided in a portion in a refrigerant circuit where refrigerant leakage detection is performed.
Figure 3:
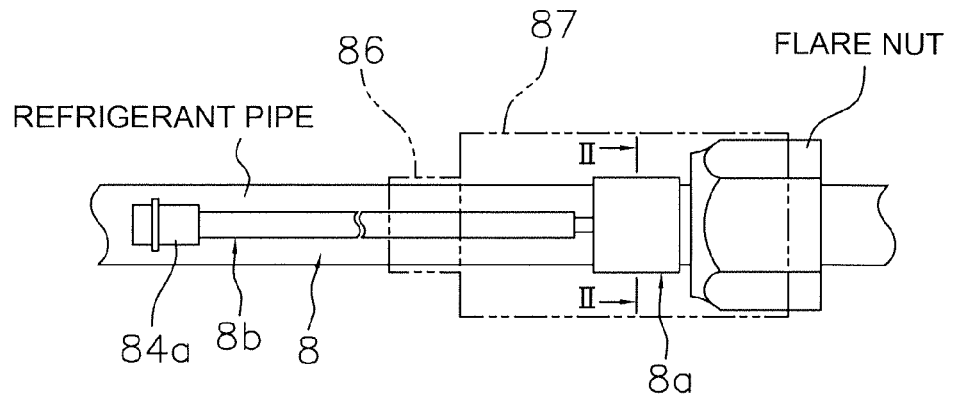
FIG. 3 is a view of FIG. 2 as seen in the direction of arrow I.
Figure 4:
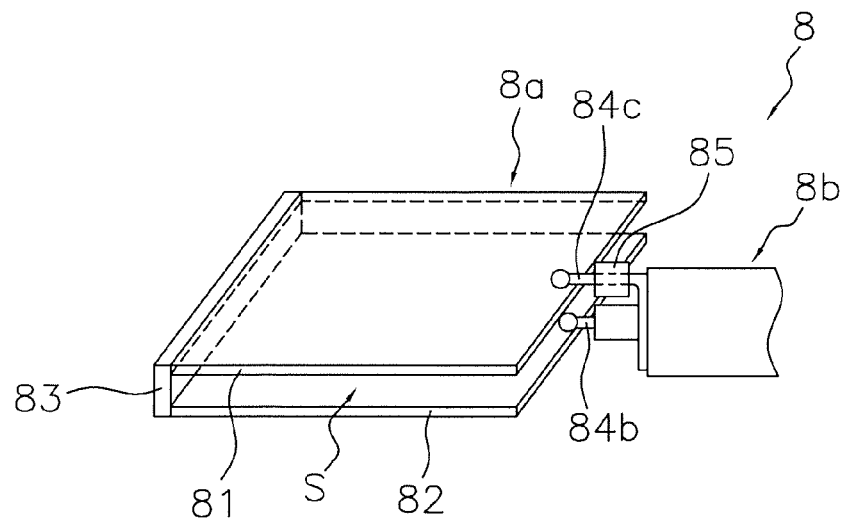
FIG. 4 is a perspective view showing the vicinity of a sensor main body of the fluid sensor.
Figure 5:
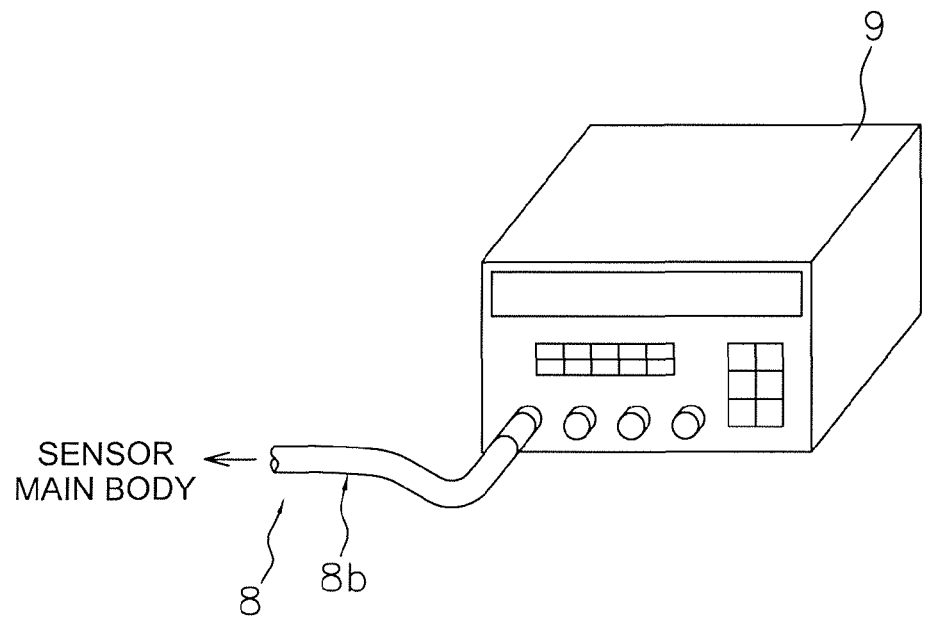
FIG. 5 is a perspective view showing an impedance measurement device.
Figure 6:
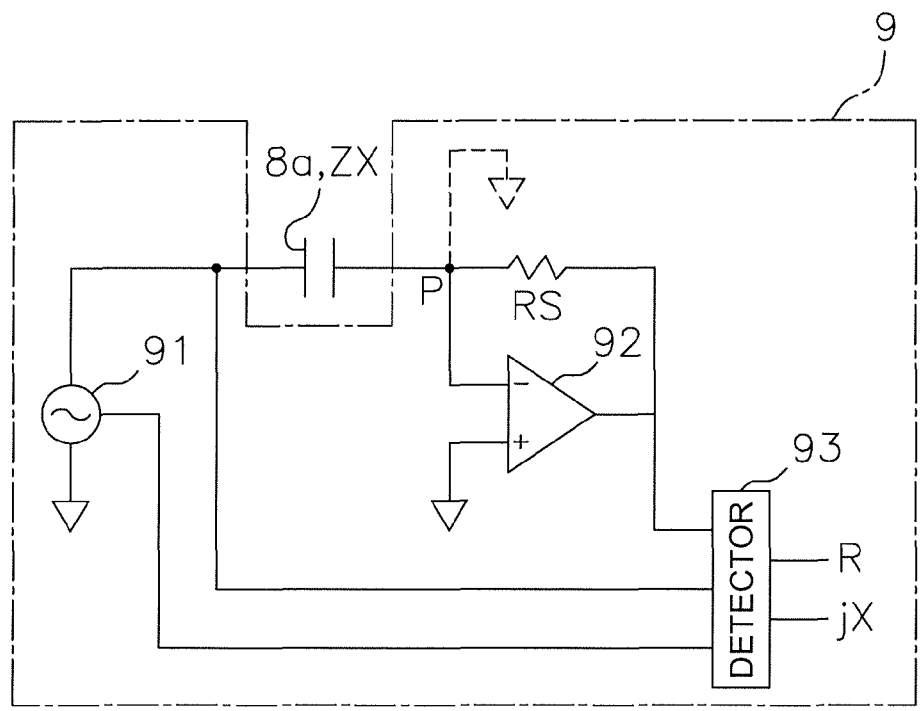
FIG. 6 is a schematic structural diagram of an impedance measurement circuit.
Figure 7:
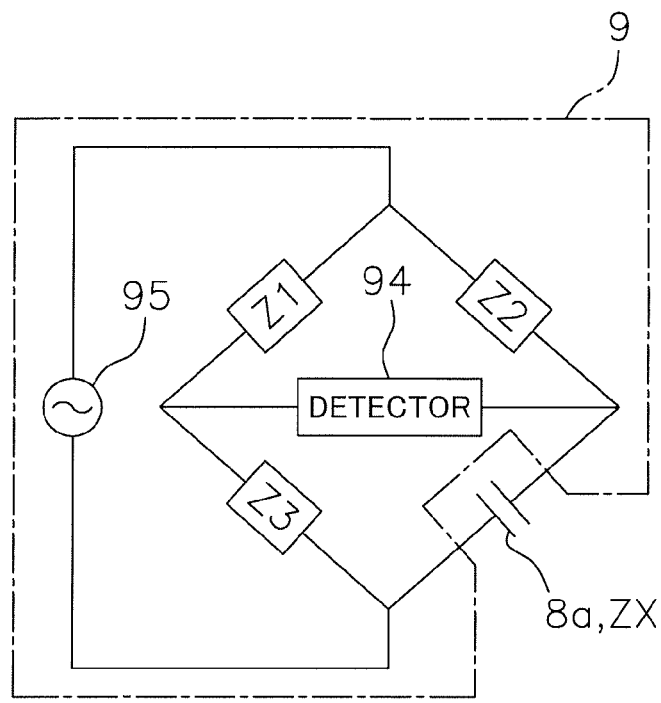
FIG. 7 is a schematic structural diagram of the impedance measurement circuit.

In view of this, in the air-conditioning apparatus 1 of the present embodiment, a fluid sensor 8 is disposed in or in proximity to a portion in the refrigerant circuit 10 where there is a high danger of refrigerant leakage, and by using the fluid sensor 8, it is capable of detecting refrigerant leakage from the refrigerant circuit 10 of the air-conditioning apparatus 1 while pinpointing the location in the refrigerant circuit 10 where the refrigerant leakage is occurring. The following is a description, made using FIGS. 1 through 7, of the configuration of the fluid sensor 8 and the like for detecting refrigerant leakage in the present embodiment. FIG. 2 is a drawing showing a state in which the fluid sensor 8 in the present embodiment has been provided in or in proximity to a portion in the refrigerant circuit 10 where refrigerant leakage is detected. FIG. 3 is a view of FIG. 2 as seen in the direction of arrow I. FIG. 4 is a perspective view showing the vicinity of a sensor main body 8a of the fluid sensor 8 in the present embodiment. FIG. 5 is a perspective view showing an impedance measurement device 9 used in the present embodiment. FIGS. 6 and 7 are schematic structural diagrams of an impedance measurement circuit.

In the air-conditioning apparatus 1 of the present embodiment, the pipe joints in brazed portions, portions connected by flare nuts, or other portions throughout the refrigerant circuit 10 are considered primarily to be the components in the refrigerant circuit 10 where there is a high danger of refrigerant leakage occurring. Therefore, the fluid sensors 8 are respectively disposed in the pipe joint connecting the first shutoff valve 26 and the first refrigerant communication pipe 5 or the proximity thereof, the pipe joint connecting the second shutoff valve 27 and the second refrigerant communication pipe 6 or the proximity thereof, the pipe joint connecting the utilization unit 4 and the first refrigerant communication pipe 5 or the proximity thereof, and the pipe joint connecting the utilization unit 4 and the second refrigerant communication pipe 6 or the proximity thereof, as shown in FIG. 1. In the present embodiment, fluid sensors 8 are disposed at the aforementioned four locations, but the fluid sensors 8 are not limited to these locations and may also be disposed in other portions of the refrigerant circuit 10. The pipes and pipe joints constituting the refrigerant circuit 10 are made of copper or another metal.

Next, the specific configuration of the fluid sensor 8 in the present embodiment will be described. Since the fluid sensors 8 disposed in the aforementioned four locations all have the same configuration, the fluid sensors 8 are treated as the same unless otherwise noted.

The fluid sensor 8 has primarily the sensor main body 8a and an electrical wire 8b. The sensor main body 8a has primarily two electrodes 81, 82 spaced apart. The electrodes 81, 82 are plate-shaped members made of an electroconductive material, and in the present embodiment, the spacing of the electrodes is maintained by a spacer member 83 made of an electrically insulated material. Thus, the sensor main body 8a in the present embodiment has a flat plate-shaped structure. Copper, iron, aluminum, or another metal or highly electroconductive material is preferred as the electroconductive material used in the electrodes 81, 82, but any material can be used as long as it is electroconductive. The electrically insulated material used in the spacer member 83 is preferably a synthetic resin, a ceramic, or another highly electrically insulated material, but any material can be used as long as it is highly electrically insulated.

Connected to the electrodes 81, 82 are the electrical wire 8b such that it can be connected to an impedance measurement device 9 (described hereinafter) for measuring impedance between the two electrodes 81, 82. In the present embodiment, the electrical wire 8b is made of a coaxial cable, wherein a BNC connector 84a is attached to one end. At the other end of the electrical wire 8b, a core 84b of the coaxial cable is connected to the electrode 82 by soldering, and a shield wiring 84c of the coaxial cable is connected to the electrode 81 by soldering. When the shield wiring 84c is connected to the electrode 81, it is preferable to cover the portion where the shield wiring 84c is bundled with a heat-shrinkable tube 85 and to heat-shrink this portion in advance, in order to avoid contact between part of the shield wiring 84c and the core 84b or the electrode 82 as in the present embodiment. It is preferable to use a coaxial cable as the electrical wire 8b in view of characteristics such as electrical resistance with respect to the length of the electrical wire as described above, but the electrical wire is not limited to a coaxial cable and various other options are possible. Nor is the connector 84a attached to the electrical wire 8b limited to a BNC connector, and M, N, F, TNC, and various other types of connecters can be used according to the type and the like of terminal component of the impedance measurement device 9 to which the wire is connected. Connecting the other end of the electrical wire 8b to the electrodes 81, 82 is not limited to soldering, and various other connection methods can be used.

The fluid sensor 8 having this configuration is arranged in the present embodiment such that the sensor main body 8a is adjacent to a pipe joint (a flare nut connected portion in this case), and the electrical wire 8b is secured to a refrigerant pipe by a securing member 86 made of a band, an adhesive tape, or the like so as to preserve this arrangement. Since the sensor main body 8a has a flat plate-shaped structure, the fluid sensor 8 is compact in size and easy to handle, and it is therefore easy to install the fluid sensor 8 in proximity to a portion where refrigerant leakage will be detected. As for the timing of providing the fluid sensors 8, in cases in which the air-conditioning apparatus 1 will be newly constructed, the fluid sensors can be provided in advance in the heat source unit 2, the utilization unit 4, and other components constituting the air-conditioning apparatus 1 when factory shipping, or the fluid sensors can be provided during onsite installation of the heat source unit 2, the utilization unit 4, and other components. In cases in which the air-conditioning apparatus 1 has already been constructed and does not have a function for detecting refrigerant leakage, the fluid sensors can be provided by custom installation during a time such as maintenance.

In the air-conditioning apparatus 1 provided with such fluid sensors 8, the impedance measurement device 9 is connected to the fluid sensors 8 and the impedance is measured between the two electrodes 81, 82 of each of the sensor main bodies 8a of the fluid sensors 8, whereby refrigerant leakage from the refrigerant circuit 10 of the air-conditioning apparatus 1 is detected.

First, the principle of refrigerant leakage detection by impedance measurement will be described. As described above, the sensor main bodies 8a of the fluid sensors 8 are provided in or in proximity to portions in the refrigerant circuit 10 where refrigerant leakage will be detected and the impedance between the pairs of electrodes 81, 82 is measured, whereupon the effect of the refrigerant or the fluid resulting from refrigerant leakage entering into the spaces S between the pairs of electrodes 81, 82 is to cause variation in the impedance between cases in which refrigerant leakage from the refrigerant circuit 10 occurs and cases in which refrigerant leakage does not occur. The phrase "fluid resulting from refrigerant leakage" refers to refrigerator oil that leaks together with the refrigerant, condensed water produced by refrigerant leakage, or the like. Based on this impedance variation, it is possible to detect refrigerant leakage from the portions where the sensor main bodies 8a are provided, i.e., it is possible to detect refrigerant leakage while pinpointing the location in the refrigerant circuit 10 of the air-conditioning apparatus 1 where the refrigerant leakage is occurring. In order to allow the effect of the refrigerant or the fluid resulting from refrigerant leakage entering the spaces S between the pairs of electrodes 81, 82 to be clearly observable, it is preferable to dispose the fluid sensors 8 on the undersides of the portions where refrigerant leakage is detected and thus enable the refrigerator oil or other fluid in liquid form to easily enter the spaces S between the pairs of electrodes 81, 82 as shown in FIG. 2, and also to cover the portions including both the locations of refrigerant leakage detection and the fluid sensors 8 with films 87 or the like and thus enable the refrigerant or the fluid resulting from refrigerant leakage to easily pool in the spaces S between the pairs of electrodes 81, 82 as shown in FIGS. 2 and 3.

Next, the impedance measurement device 9 for measuring impedance between two electrodes 81, 82 will be described. Possible examples of the impedance measurement device 9 include a device using a measurement system whereby the impedance to be measured is obtained based on the voltage applied to the measured object and the electric current flowing through the object, and a device using a measurement system whereby the impedance to be measured (the impedance between the two electrodes 81, 82 in this case) is obtained based on an element for which the impedance is already known. The impedance measurement circuit shown in FIG. 6 is referred to as an LCR meter, which corresponds to the former measurement method, and the impedance measurement circuit shown in FIG. 7 is referred to as a bridge circuit, which corresponds to the latter measurement method.

First, to describe the impedance measurement circuit in the example of an LCR meter, the impedance measurement circuit has primarily a power source 91, a feedback resistor RS, an op-amp 92, and a detector 93; and impedance ZX (the sensor main body 8a in this case) is connected, thereby constituting a circuit known as a self-balancing bridge. In this impedance measurement circuit, when a voltage is applied from the power source 91, since the negative side of the op-amp 92 is connected to a point P between the impedance ZX and the feedback resistor RS, the voltage at the point P is always zero due to the effect of negative feedback, and the electric current flowing from the power source 91 through the impedance ZX all flows into the feedback resistor RS. The voltage applied to the impedance ZX is thereupon equal to the voltage of the power source 91, and the output voltage of the op-amp 92 is obtained as a product of the feedback resistor RS and the electric current flowing through the impedance ZX. Therefore, the impedance ZX can be obtained by detecting the two voltages via the detector 93 and using the product of the feedback resistor RS in the ratio of the voltages.

Next, to describe the impedance measurement circuit in the example of a bridge circuit, the impedance measurement circuit has primarily impedances Z1, Z2, Z3, a detector 94, and a power source 95; and impedance ZX (the sensor main body 8a in this case) is connected, thereby constituting a bridge circuit. In this impedance measurement circuit, the impedance ZX of the sensor main body 8a can be obtained by applying a voltage from the power source 95 and adjusting the impedances Z1, Z2, Z3 so that the output in the detector 94 is zero.

Refrigerant leakage can be detected in the following manner using this type of impedance measurement device 9. First, during a state in which no refrigerant is leaking from the refrigerant circuit 10 (e.g., immediately after the air-conditioning apparatus 1 has been constructed or the fluid sensor 8 has been installed), the fluid sensor 8 is connected to the impedance measurement device 9, and the impedance ZX is measured for a state in which no refrigerant is leaking from the portion in the refrigerant circuit 10 where refrigerant leakage detection is performed. After a predetermined time period has elapsed, the fluid sensor 8 is once again connected to the impedance measurement device 9, the impedance ZX is measured, and this impedance is compared with the impedance ZX measured during the state in which no refrigerant was leaking from the portion in the refrigerant circuit 10 where refrigerant leakage detection is performed. In cases in which a change exceeding a threshold has occurred, it is concluded that refrigerant is leaking from the refrigerant circuit 10 and the location of refrigerant leakage is in or in proximity to the portion where the fluid sensor 8 being measured is placed. In cases in which no changes exceeding the threshold have occurred in any of the fluid sensors 8, it is concluded that refrigerant leakage is not occurring in the refrigerant circuit 10. Either the LCR meter or the bridge circuit can be used as the impedance measurement device 9, but the smaller and more portable LCR meter is more effective than the bridge circuit, which has high measurement precision but is somewhat troublesome to manage and adjust. The smaller and more portable LCR meter is particularly effective in cases such as the present embodiment in which only fluid sensors 8 are provided to the air-conditioning apparatus 1 and the impedance measurement device 9 is connected only when refrigerant leakage detection is performed.

With the fluid sensor 8 of the present embodiment, it is thereby possible to detect refrigerant leakage while specifying, based on the change in impedance between the two electrodes 81, 82 of the sensor main body 8a, that the refrigerant leakage is occurring from the portion where the sensor main body 8a is provided, i.e., the location in the refrigerant circuit 10 of the air-conditioning apparatus 1 where the refrigerant leakage is occurring. Particularly, since the fluid sensor 8 is provided in or in proximity to the portion in the refrigerant circuit 10 where refrigerant leakage detection is performed in the air-conditioning apparatus 1 of the present embodiment, it is possible to detect refrigerant leakage while specifying that the refrigerant leakage is occurring from the portion where the sensor main body 8a is provided, i.e., the location in the refrigerant circuit 10 of the air-conditioning apparatus 1 where the refrigerant leakage is occurring by connecting the impedance measurement device 9 to the fluid sensor 8 when refrigerant leakage detection is performed. Even if the air-conditioning apparatus 1 has already been constructed and has no function for detecting refrigerant leakage, if the fluid sensors 8 are custom installed, it is possible to perform refrigerant leakage detection by connecting the impedance measurement device 9 thereto.

(3) Modification 1

In the embodiment described above, a space S is merely formed between the two electrodes 81, 82 constituting the sensor main body 8a of the fluid sensor 8 as shown in FIG. 4, and since it is difficult for refrigerant or fluid resulting from refrigerant leakage to actively pool in between the two electrodes 81, 82 in this space S, there are cases in which refrigerant leakage cannot be detected if the amount leaked is extremely small, for example.

Figure 8:
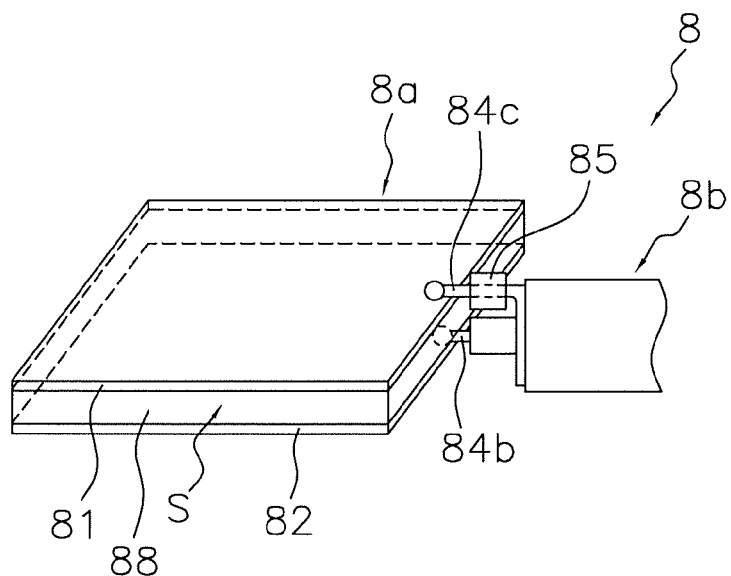
FIG. 8 is a perspective view showing the vicinity of a sensor main body of a fluid sensor according to Modification 1.

In view of this, in the fluid sensor 8 of the present modification, a fluid holder 88 for holding the refrigerant or the fluid resulting from refrigerant leakage is provided in the space S between the two electrodes 81, 82 as shown in FIG. 8, and the refrigerant or the fluid resulting from refrigerant leakage entering in between the two electrodes 81, 82 is held and collected in the fluid holder 88.

For example, when refrigerator oil is to be the fluid resulting from refrigerant leakage and is actively held between the two electrodes 81, 82, paper is used as the fluid holder 88, the refrigerator oil that has entered between the two electrodes 81, 82 can be held and collected by being soaked up by the fluid holder 88. When paper is used as the fluid holder 88 being highly lipophilic, the refrigerator oil can be effectively held, and reductions in electric capacitance can also be prevented because the fluid holder hardly swell when the oil is soaked up. Furthermore, using a highly water repellent paper makes it possible to prevent condensation water resulting from the refrigerant leakage from being soaked up in the paper and to minimize the effects of condensation water. When condensation water resulting from the surrounding air being cooled by refrigerant leakage is to be the fluid resulting from refrigerant leakage and is actively held between the two electrodes 81, 82, using a highly hydrophilic fluid holder 88 made of paper or another substance that hardly swell easily when condensation water is soaked up makes it possible to prevent reductions in electric capacitance caused by effectively holding condensation water or soaking up refrigerator oil, and using a highly oil repellent paper or the like makes it possible to prevent refrigerator oil resulting from refrigerant leakage from being soaked up in the paper and to minimize the effects of the refrigerator oil. When the refrigerant is to be actively held between the two electrodes 81, 82, an adsorbent that adsorbs the refrigerant (e.g., zeolite or the like) can be used as the fluid holder 88, for example, or a substance composed of paper supporting an adsorbent that adsorbs the refrigerant can be used as the fluid holder 88. When an adsorbent that adsorbs the refrigerant or paper or another substance supporting the adsorbent is used as the fluid holder 88, it is preferable to use an adsorbent that is highly selective with respect to the refrigerant used in the air-conditioning apparatus 1. Besides paper, other possible substances that can be used as the fluid holder 88 include cloth, resins, ceramics and other porous substances, crystalline bodies, films, and the like; and in cases in which refrigerant leakage is detected primarily from the effects of the refrigerator oil, paper is preferably used in view of the cost of the materials, ease of processing, and other factors.

It is thereby possible to increase the precision of refrigerant leakage detection in the fluid sensor 8 and the air-conditioning apparatus 1 of the present modification, even if the amount of refrigerant leakage is extremely small. In cases in which paper is used as the fluid holder 88, the refrigerator oil, which does not readily evaporate or diffuse, can be held and accumulated by being soaked up by the paper used as the fluid holder 88 even after the leakage; therefore, it is possible to more reliably ascertain evidence of refrigerant leakage and thereby to further increase the precision of refrigerant leakage detection, in comparison with cases in which the readily evaporating and diffusing refrigerant is held by the fluid holder 88 after leakage.

(4) Modification 2

In both the embodiment described above and Modification 1, the sensor main body 8a of the fluid sensor 8 was provided to a portion in the refrigerant circuit 10 where refrigerant leakage detection was performed, but depending on the situation, there are cases in which the sensor main body 8a must be placed in proximity to the portion in the refrigerant circuit 10 where refrigerant leakage detection is performed, yet separate from the portion in the refrigerant circuit 10 where refrigerant leakage detection is performed.

In such cases, a fluid-guiding member 89 may be provided for leading refrigerant or fluid resulting from refrigerant leakage from the portion in the refrigerant circuit 10 where refrigerant leakage detection is performed to the sensor main body 8a, and the refrigerant or fluid resulting from refrigerant leakage may be actively led between the two electrodes 81, 82.

Figure 9:
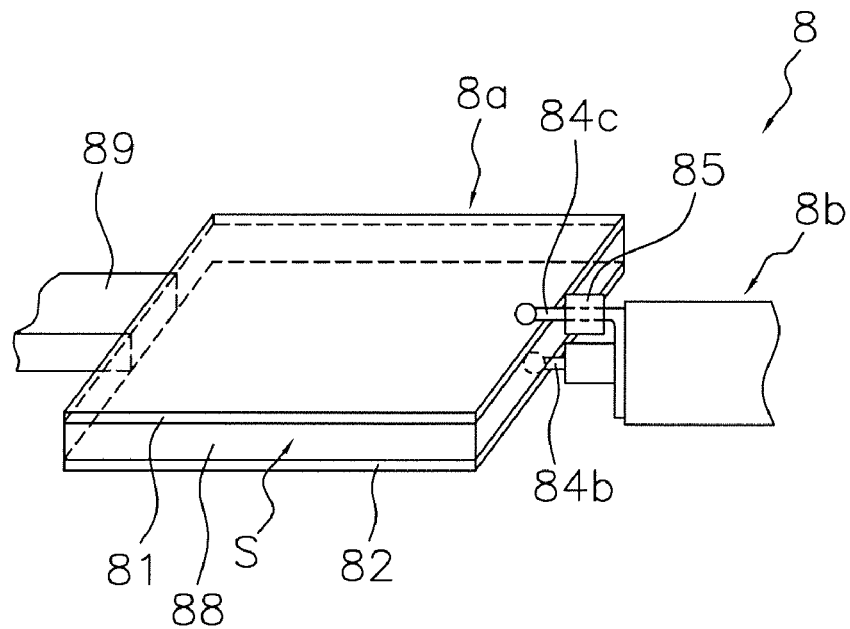
FIG. 9 is a perspective view showing the vicinity of a sensor main body of a fluid sensor according to Modification 2.

For example, using the fluid sensor 8 in Modification 1 as an example, one considerable option is to position one end of the fluid-guiding member 89 in the space S (on the fluid holder 88 in this case) between the two electrodes 81, 82 as shown in FIG. 9, and to put the other end of the fluid-guiding member 89 in contact with the portion in the refrigerant circuit 10 where refrigerant leakage detection is performed. Possible examples that can be used as the fluid-guiding member 89 include paper, cloth, resins, ceramics and other porous substances, crystalline bodies, films, and the like, similar to the fluid holder 88; and a material is used which is suitable for the refrigerant or the fluid resulting from refrigerant leakage that will be led to the space S between the two electrodes 81, 82. A configuration provided with this type of fluid-guiding member 89 can also be applied to the sensor main body 8a shown in FIG. 4, which has no fluid holder 88 provided between the two electrodes 81, 82.

It is thereby possible with the fluid sensor 8 of the present modification to increase the precision of refrigerant leakage detection even though the sensor main body 8a must be placed separate from the portion in the refrigerant circuit 10 where refrigerant leakage detection is performed, because the refrigerant or fluid resulting from refrigerant leakage can be led between the two electrodes 81, 82.

(5) Modification 3

In the embodiment described above as well as Modifications 1 and 2, the sensor main body 8a with a flat plate-shape structure is used as shown in FIGS. 2 to 4, 8, and 9, but the sensor main body 8a may also have a structure that can be attached so as to wind around the pipes or pipe joints constituting the refrigerant circuit 10.

Figure 10:
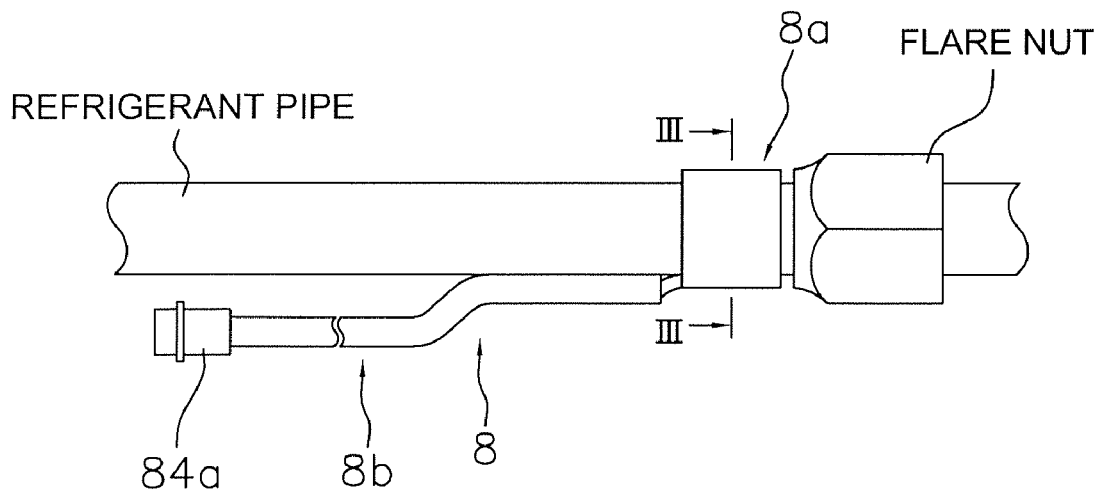
FIG. 10 is a drawing showing a state in which a fluid sensor according to Modification 3 has been provided in a portion in a refrigerant circuit where refrigerant leakage detection is performed.
Figure 11:
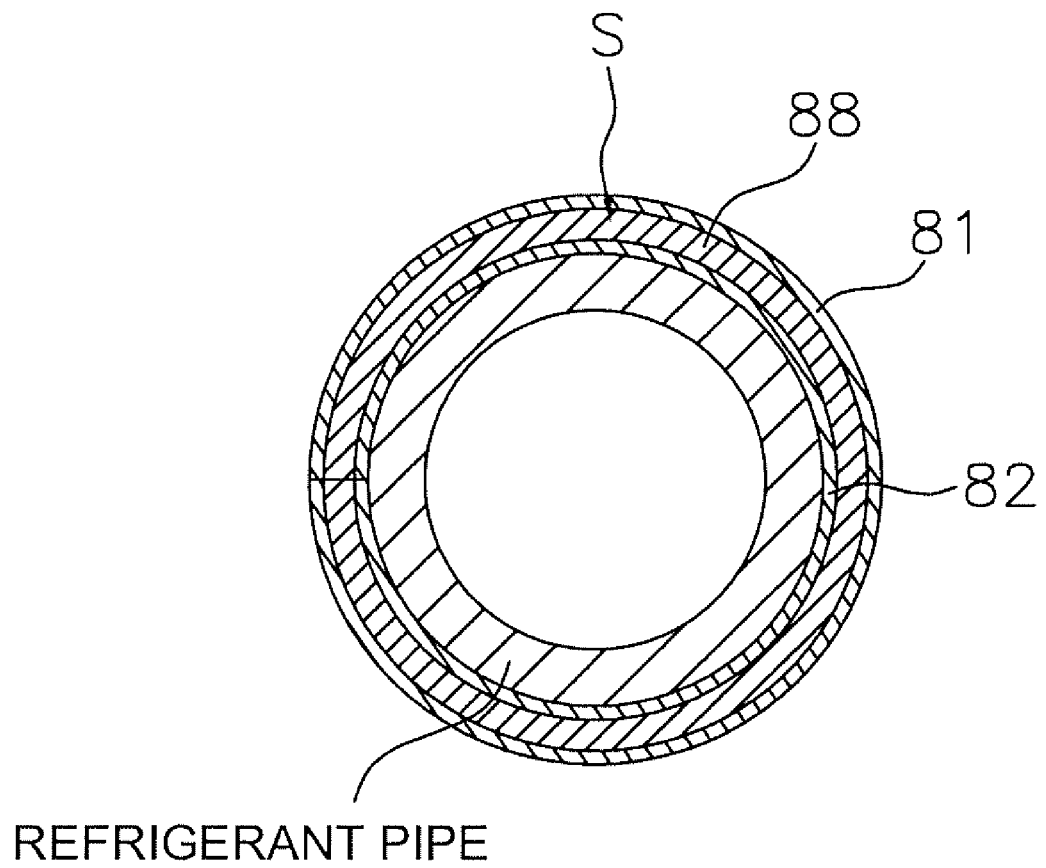
FIG. 11 is a cross-sectional view along line in FIG. 10.

For example, one possibility is to attach a sensor main body having a fluid holder 88 provided in the space S between the two electrodes 81, 82 so that the sensor main body winds around a pipe, as is the case with the sensor main body 8a of the fluid sensor 8 of the present modification shown in FIGS. 10 and 11. This sensor main body 8a may also be attached so as to wind around a pipe joint rather than a pipe.

It is thereby possible with the fluid sensor 8 of the present modification to effectively lead refrigerant or fluid resulting from refrigerant leakage in between the two electrodes 81, 82, and it is therefore possible to reliably ascertain evidence of refrigerant leakage and thereby to improve the precision of refrigerant leakage detection.

(6) Modification 4

In the embodiment described above as well as Modifications 1 through 3, there could possibly be cases in which the electric capacitance of the sensor main body 8a is small and the precision of refrigerant leakage detection is insufficient, because the electrodes 81, 82 having a single-layer structure are used, wherein only one space S formed by the electrode 81 and the electrode 82 is provided as shown in FIGS. 4, 8, 9, and 11.

In view of this, in the fluid sensor 8 of the present modification, electrodes 81, 82 having a multilayered structure are used, wherein a plurality of spaces formed by the electrode 81 and the electrode 82 are provided.

Figure 12:
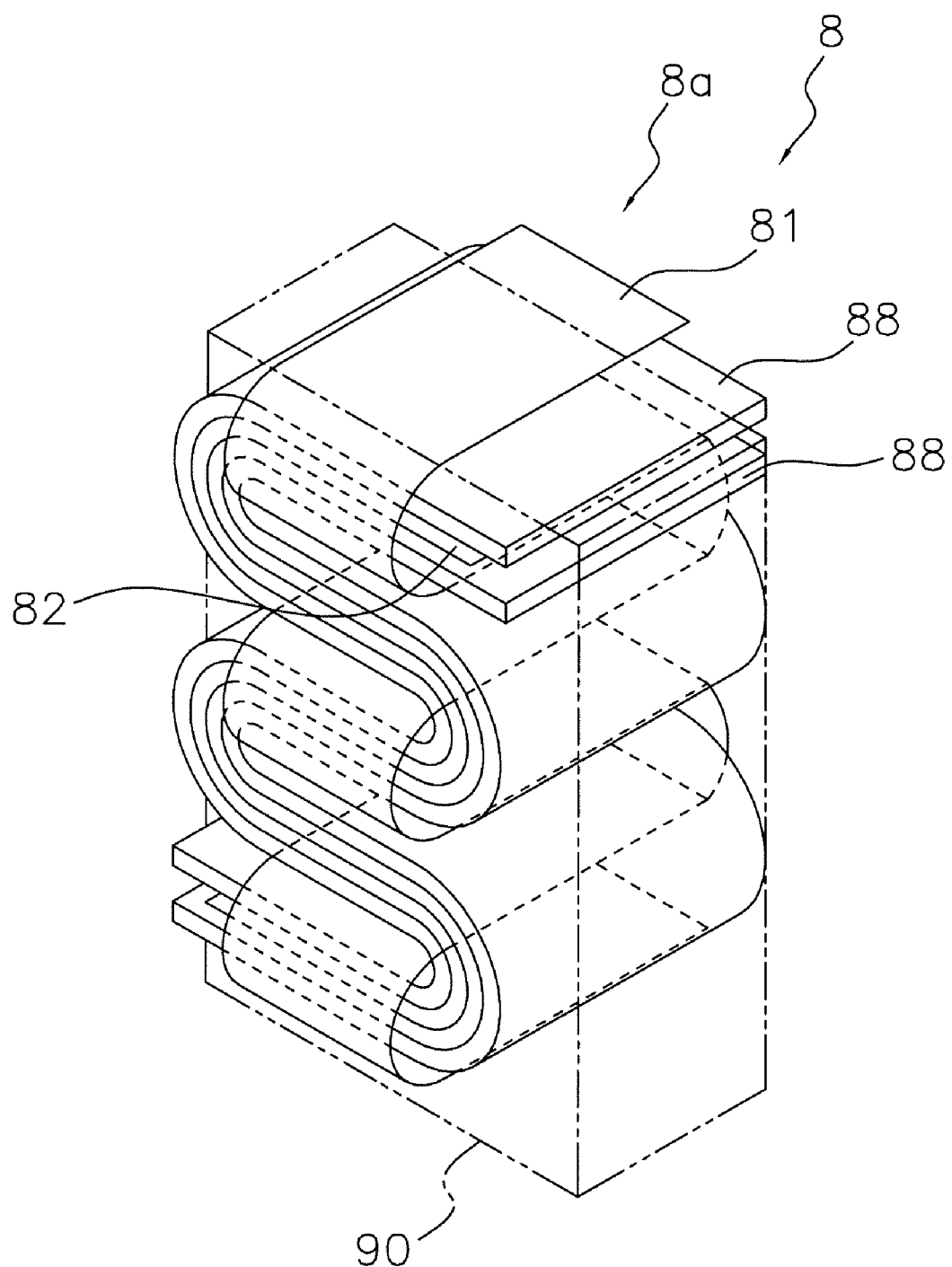
FIG. 12 is a perspective view showing the vicinity of a sensor main body of a fluid sensor according to Modification 4.
Figure 13:
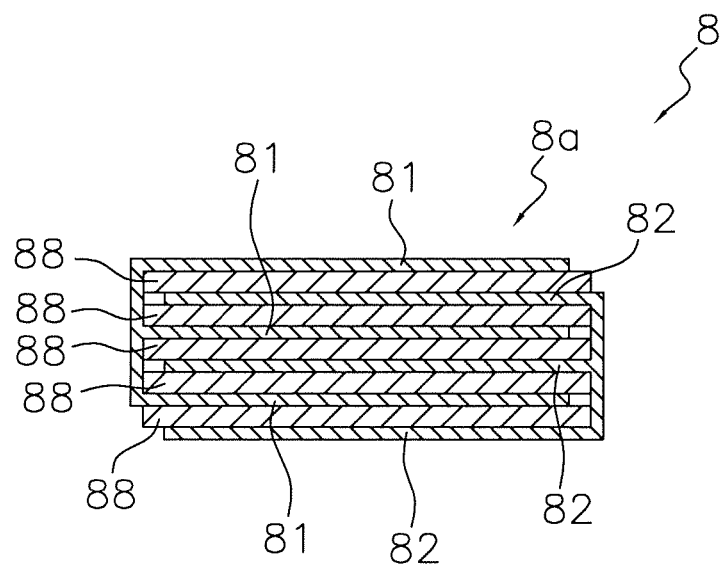
FIG. 13 is a drawing showing the vicinity of a sensor main body of a fluid sensor according to Modification 4, and is a cross-sectional view along line II-II in FIG. 3.
Figure 14:
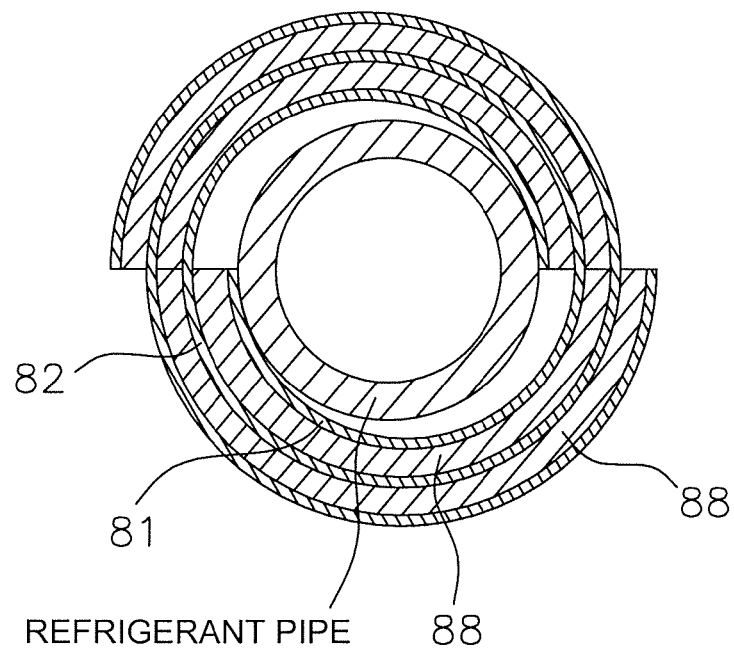
FIG. 14 is a drawing showing the vicinity of the sensor main body of the fluid sensor according to Modification 4, and is a cross-sectional view along line in FIG. 10.

For example, in one possibility shown in FIG. 12, an electrode 81, an electrode 82, and two fluid holders 88 are formed into belt shapes, and the fluid holders 88 are superposed over both surfaces of the electrode 82, which is folded over multiple times. The electrode 81 is folded over multiple times and incorporated from a direction orthogonal to the electrode 82 with the fluid holders 88 superposed over both sides, an electrical wire 8b is connected to the electrodes 81, 82 by soldering or another method (not shown in FIG. 12), and a heat-shrinkable tube 90 is then made to cover the arrangement and is heat-shrunk, thereby constituting a flat plate-shaped sensor main body 8a. Another possibility is to stack the members multiple times in the following sequence as shown in FIG. 13: an electrode 81, a fluid holder 88 (i.e., space S), an electrode 82, the fluid holder 88 (i.e., space S), etc., wherein the electrodes 81 are connected to each other, the electrodes 82 are connected to each other, and the electrical wire 8b is connected by soldering or another method to the electrodes 81, 82 (not shown in FIG. 13), thereby constituting a flat plate-shaped sensor main body 8a. Another possibility is a configuration in which the members are attached so as to wind multiple times around the refrigerant pipe in the following sequence as shown in FIG. 14: an electrode 81, a fluid holder 88 (i.e., space S), an electrode 82, the fluid holder 88 (i.e., space S). Note that these cases are similar to the embodiment described above as well as Modifications 1 through 3 in that the configuration has two types of electrodes 81, 82 which electrically oppose each other.

It is thereby possible with the fluid sensor 8 of the present modification to increase the electric capacitance of the sensor main body 8a and thereby to improve the precision of refrigerant leakage detection, because the electrodes 81, 82 having a multilayered structure are used.

(7) Modification 5

In Modifications 1 through 4 described above, a structure was presented in which the fluid holder 88 is provided in the space S between the two electrodes 81, 82 constituting the sensor main body 8a as shown in FIGS. 8, 9, and 11 to 14, whereby refrigerant or fluid resulting from refrigerant leakage entering in between the two electrodes 81, 82 is held and accumulated in the fluid holder 88.

However, in cases in which an attempt to increase the precision of refrigerant leakage detection is made by performing refrigerant leakage detection on the basis of changes in impedance unique to a specified fluid among the refrigerant or fluid resulting from refrigerant leakage, it is preferable to prevent to the fullest extent possible a fluid and the like other than the refrigerant or a specified fluid resulting from refrigerant leakage from entering between the two electrodes 81, 82, and to thereby prevent a fluid and the like other than the refrigerant or a specified fluid resulting from refrigerant leakage from being held in the fluid holder 88. Particularly, in a structure such as Modification 2 wherein the fluid-guiding member 89 is provided in the sensor main body 8a and the refrigerant or fluid resulting from refrigerant leakage is thereby actively led between the two electrodes 81, 82, there are cases in which the electrodes 81, 82 and the fluid holder 88 are placed in a location separated from the portion where refrigerant leakage detection is performed, and fluid and the like other than the refrigerant or a specified fluid resulting from refrigerant leakage readily enters in between the two electrodes 81, 82. It is therefore even more preferable to prevent fluid and the like other than the refrigerant or a specified fluid resulting from refrigerant leakage from being held in the fluid holder 88.

In view of this, in the present modification, a fluid holder 88 and electrodes 81, 82 are covered by a casing 101 constituting a sensor main body 8a, whereby fluid and the like other than the refrigerant or a specified fluid resulting from refrigerant leakage is prevented to the fullest extent possible from being held in the fluid holder 88. A fluid-guiding member 89 for leading the refrigerant or fluid resulting from refrigerant leakage in between the two electrodes 81, 82 is also provided so as to protrude from the interior of the casing 101 to the exterior of the casing 101, whereby the refrigerant or specified fluid resulting from refrigerant leakage can be led into the casing 101 and held and accumulated in the fluid holder 88, and thereby the precision of refrigerant leakage detection can be even further improved.

Figure 15:
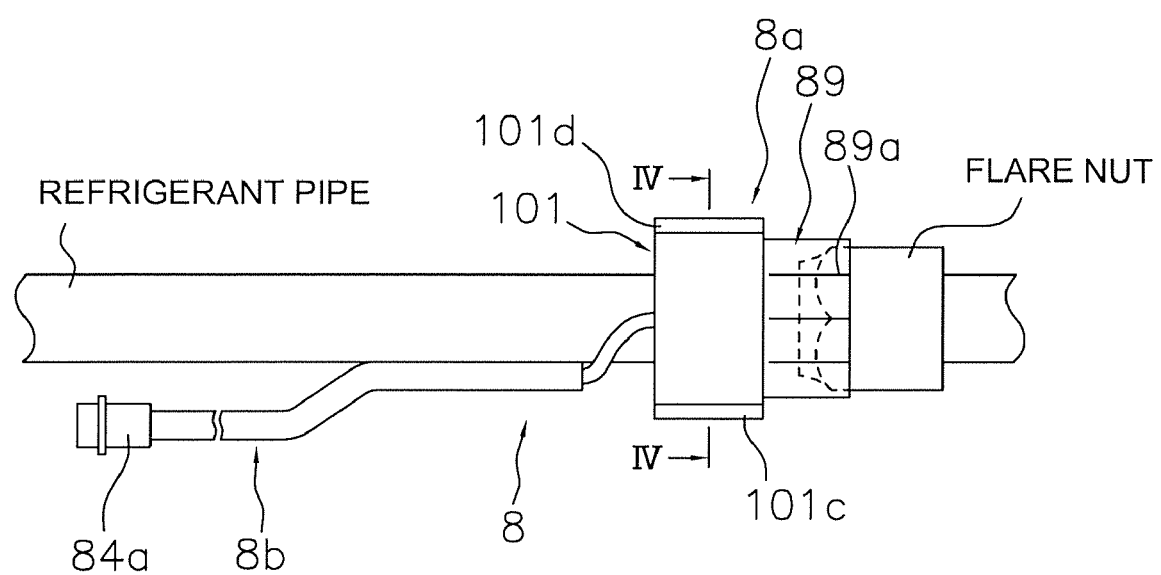
FIG. 15 is a drawing showing a state in which a fluid sensor in Modification 5 has been provided in or in proximity to a portion in a refrigerant circuit where refrigerant leakage detection is performed.
Figure 16:
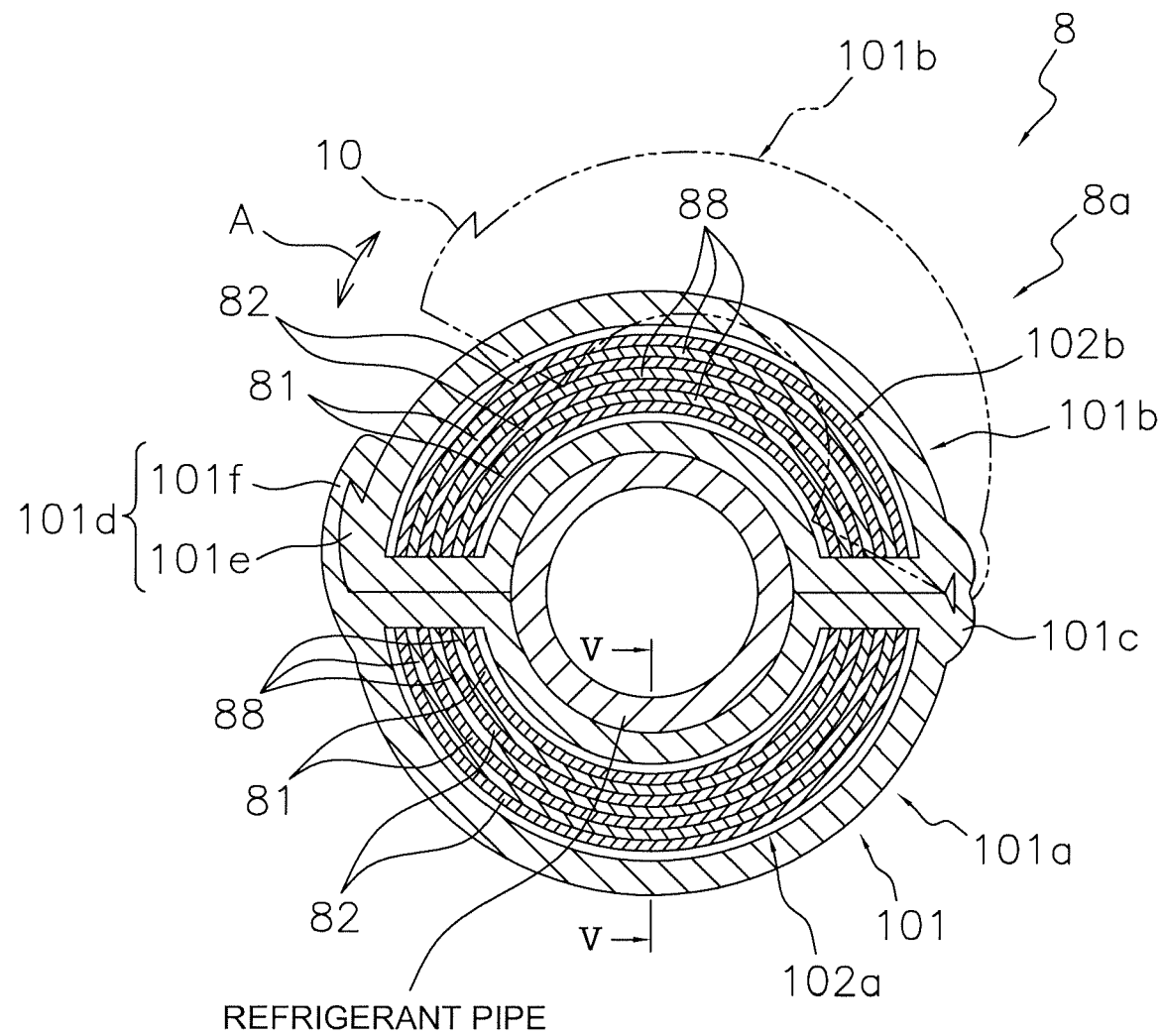
FIG. 16 is a cross-sectional view along line IV-IV in FIG. 15.
Figure 17:
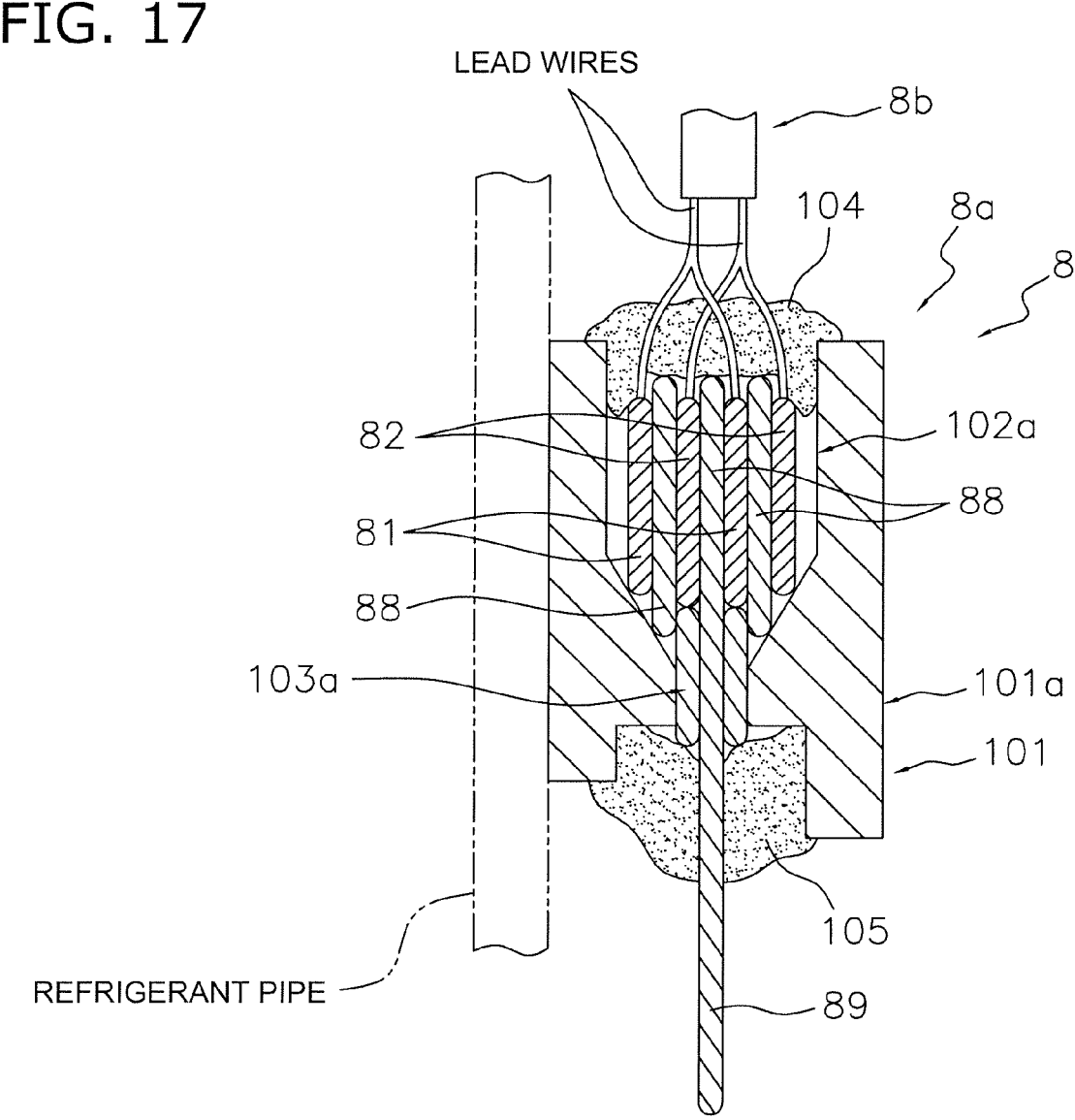
FIG. 17 is a cross-sectional view along line V-V in FIG. 16.

For example, to make an example of a case in which refrigerator oil is the fluid resulting from refrigerant leakage, the electrodes 81, 82 and the fluid holders 88 having a multilayered structure are accommodated within accommodating parts 102a, 102b formed in the casing 101 which can be attached so as to wind around the pipes constituting the refrigerant circuit 10, as shown in FIGS. 15 to 17. The fluid-guiding member 89 can be made to protrude to the exterior of the casing 101 through openings 103a, 103b communicated with the accommodating parts 102a, 102b (Note that FIG. 17 shows only a longitudinal cross-sectional view of a columnar part 101a and does not show a columnar part 101b, but since the columnar part 101b has the same longitudinal cross section as the columnar part 101a, the opening 103b and other parts formed in the columnar part 101b have the same shapes as the opening 103a and other parts formed in the columnar part 101a). To describe the structure of the sensor main body 8a and the casing 101 hereinbelow, the sensor main body 8a is in a state of being attached so as to wind around a pipe constituting the refrigerant circuit 10, wherein the cross section (FIG. 16) of the sensor main body 8a (or the casing 101) when the refrigerant pipe is cut transversely is a transverse cross section, and the cross section (FIG. 17) of the sensor main body 8a (or the casing 101) when the refrigerant pipe is cut longitudinally is a longitudinal cross section.

The casing 101 has the two columnar parts 101a, 101b whose transverse cross sections are substantially crescent shapes. The columnar parts 101a, 101b are composed of a synthetic resin or another electrically insulative material. Inside of each of the columnar parts 101a, 101b are formed accommodating parts 102a, 102b whose transverse cross sections are substantially crescent shapes. Inside of each of the accommodating parts 102a, 102b, the fluid holder 88 and the electrodes 81, 82 are accommodated in a multilayered state of being layered with respect to the radial direction of the refrigerant pipe in the following sequence: the electrode 81, the fluid holder 88, the electrode 82, the fluid holder 88, the electrode 81, the fluid holder 88, the electrode 82. The electrodes 81, 82 are composed of an electroconductive material as copper, iron, aluminum, or another metal and the like, similar to the embodiment and modifications described above. The fluid holder 88 is composed of a highly lipophilic material as paper and the like, similar to the embodiment and modifications described above.

Each of the accommodating parts 102a, 102b open to the outside of each of the columnar parts 101a, 101b at one end in the pipe longitudinal direction. In the openings of each of the accommodating parts 102a, 102b at one end in the pipe longitudinal direction, the opening area when viewed from the pipe longitudinal direction is of a size through which a multilayered stack of the electrode 81, the fluid holder 88, and the electrode 82 can be inserted (see FIG. 17; note that FIG. 17 shows only a longitudinal cross section of the columnar part 101a, but the columnar part 101b has the same longitudinal cross section as the columnar part 101a). The lead wires of the electrodes 81, 82 are drawn out of the columnar parts 101a, 101b through the openings at one end in the pipe longitudinal direction of each of the accommodating parts 102a, 102b, and are connected to an electrical wire 8b (see FIG. 17). With the lead wires of the electrodes 81, 82 having been drawn out of the columnar parts 101a, 101b, the openings at one end in the pipe longitudinal direction of each of the accommodating parts 102a, 102b are filled in by a sealant 104, which can contribute to preventing a fluid and the like other than the refrigerant or a specified fluid resulting from refrigerant leakage (refrigerator oil in this case) from entering the accommodating parts 102a, 102b. The sealant 104 herein is composed of a silicon resin or another electrically insulative material.

Openings 103a, 103b communicated with the accommodating parts 102a, 102b are formed in the columnar parts 101a, 101b. Each of the openings 103a, 103b is placed so as to communicate with the opening in the other end of each of the accommodating parts 102a, 102b in the pipe longitudinal direction. In the openings 103a, 103b, the opening area when viewed from the pipe longitudinal direction is less than the opening area of each of the accommodating parts 102a, 102b. Specifically, each of the openings 103a, 103b is narrowed so as to be smaller in opening size than each of the accommodating parts 102a, 102b covering the fluid holder 88 and the electrodes 81, 82. The fluid-guiding member 89, which leads refrigerant or refrigerator oil as a specified fluid resulting from refrigerant leakage between the electrodes 81, 82 (i.e., to the fluid holder 88) inside of each of the accommodating parts 102a, 102b, protrudes from each of the accommodating parts 102a, 102b through the openings 103a, 103b to the outside of the columnar parts 101a, 101b. Specifically, the openings 103a, 103b are formed in the casing 101 in order to allow the fluid-guiding member 89 to protrude from the interior of the casing 101 to the exterior of the casing 101. The fluid-guiding member 89 is composed of a highly lipophilic material as paper and the like, similar to the fluid holder 88. Since the fluid-guiding member 89 has a portion exposed to the exterior of the casing 101, the selectivity of the fluid-guiding member 89 with regard to the refrigerator oil is preferably higher than that of the fluid holder 88 covered by the accommodating parts 102a, 102b. Therefore, a highly water repellent material is preferably used as the fluid-guiding member 89. Thus, the opening size of the openings 103a, 103b for allowing the fluid-guiding member 89 to protrude from the interior of the casing 101 to the exterior of the casing 101 is less than that of the accommodating parts 102a, 102b covering the fluid holder 88 and the electrodes 81, 82, whereby fluids (e.g., condensation water) and the like other than the refrigerant or a specified fluid (refrigerator oil in this case) resulting from refrigerant leakage can be hindered from entering the accommodating parts 102a, 102b. Each of the openings 103a, 103b is provided with a sealant 105 for filling in the gaps between each of the openings 103a, 103b and the fluid-guiding member 89 in a state of the fluid-guiding member 89 protruding from the openings 103a, 103b. This can contribute to preventing fluids (e.g., condensation water) and the like other than the refrigerant or a specified fluid (refrigerator oil in this case) resulting from refrigerant leakage from entering the accommodating parts 102a, 102b. The sealant 105 herein is composed of an electroconductive material as silicon resin and the like. Somewhat increasing the length of the portion of the fluid-guiding member 89 exposed outside of the casing 101 makes it possible to reliably collect the refrigerant leaked out from the detection location (the flare nut portion in FIG. 15) or the specified fluid (refrigerator oil in this case) resulting from refrigerant leakage. A plurality of incisions 89a running in the pipe longitudinal direction (see FIG. 15) is also formed in the fluid-guiding member 89, making it easy for the fluid-guiding member 89 to be deformed according to the shape of the detection location (the flare nut portion in FIG. 15 in this case), and also making it even easier to collect the refrigerant leaked out from the detection location or the specified fluid (refrigerator oil in this case) resulting from refrigerant leakage.

Further, the columnar parts 101a, 101b are configured so that one pair of ends in transverse cross section are respectively linked together by a hinge 101c, while each of the other ends in transverse cross section are capable of moving relative to each other about the hinge 101c in the direction of arrow A (see FIG. 16). In cases in which the columnar parts 101a, 101b are made of a synthetic resin, the hinge 101c that uses the deformability of the synthetic resin can be integrally molded with the columnar parts 101a, 101b.

The columnar parts 101a, 101b are capable of detachably latching together at each of the other ends in transverse cross section via a latching part 101d, whereby the sensor main body 8a can be detachably latched onto the pipe or pipe joint constituting the refrigerant circuit 10. Therefore, the operation of attaching or removing the fluid sensor 8 is easy. Pawls 101e, 101f and the like (see FIG. 16) that enable the other ends of each of the columnar parts 101a, 101b in transverse cross section to latch together so as to not separate can be used as the latching part 101d. In cases in which the columnar parts 101a, 101b are made of a synthetic resin, the latching part 101d (the pawls 101e, 101f in FIG. 16) can be integrally molded with the columnar parts 101a, 101b.

Figure 18:
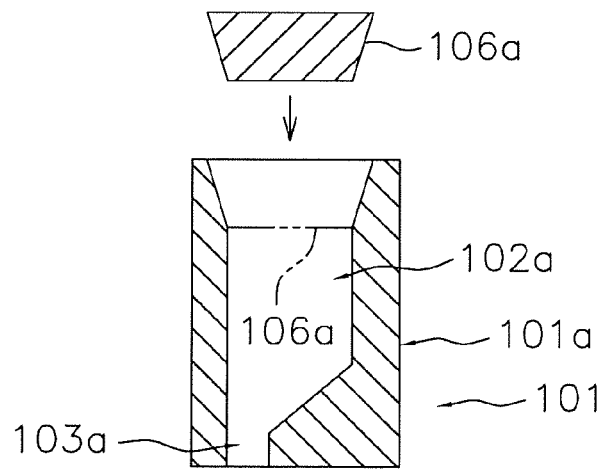
FIG. 18 is a cross-sectional view of a casing constituting a fluid sensor in Modification 5, and is a drawing corresponding to FIG. 17.

In the fluid sensor 8 described above, the sealant 104 covers the opening at the one ends in the pipe longitudinal direction of the accommodating parts 102a, 102b of each of the columnar parts 101a, 101b constituting the casing 101 (see FIG. 17), but this opening may also be covered by lid members 106a, 106b for covering the opening at the other ends in the pipe longitudinal direction of the accommodating parts 102a, 102b (see FIG. 18; FIG. 18 shows only a longitudinal cross section of the columnar part 101a and the lid member 106a, but the columnar part 101b and the lid member 106b have the same longitudinal cross sections as the columnar part 101a and the lid member 106a). In this case as well, the opening at the one ends in the pipe longitudinal direction of the accommodating parts 102a, 102b is of a size through which a multilayered stack of the electrode 81, the fluid holder 88, and the electrode 82 can be inserted, whereby the fluid holder 88 and the electrodes 81, 82 can be easily inserted through each of the accommodating parts 102a, 102b.

Figure 19:
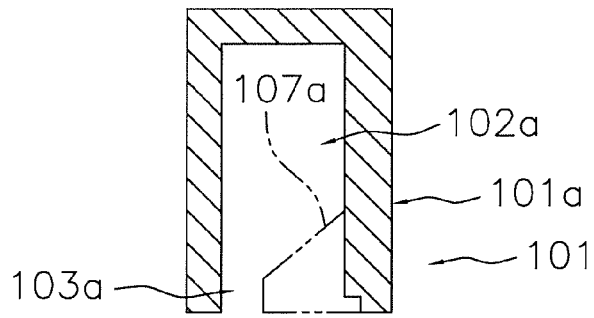
FIG. 19 is a cross-sectional view of a casing constituting a fluid sensor in Modification 5, and is a drawing corresponding to FIG. 17.
Figure 19:
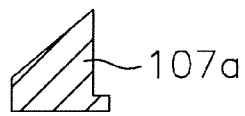

Another possibility for each of the columnar parts 101a, 101b is to use parts that do not have an opening in the one ends of the accommodating parts 102a, 102b in the pipe longitudinal direction. For example, the other ends in the pipe longitudinal direction of the accommodating parts 102a, 102b are provided with an opening of a size through which a multilayered stack of the electrode 81, the fluid holder 88, and the electrode 82 can be inserted, and the fluid holder 88 and the electrodes 81, 82 are inserted through each of the accommodating parts 102a, 102b, after which part of the opening in the other ends of the accommodating parts 102a, 102b in the pipe longitudinal direction may be covered by wedge members 107a, 107b, thereby forming openings 103a, 103b that are smaller than the opening size of the accommodating parts 102a, 102b (see FIG. 19; FIG. 19 shows only a longitudinal cross section of the columnar part 101a and the wedge member 107a, but the columnar part 101b and the wedge member 107b have the same longitudinal cross section as the columnar part 101a and the wedge member 107a).

In the present modification, the outer shape of the casing 101 is a substantially cylinder, but is not limited thereto and may be a prismatic column. The spatial shapes of the accommodating parts 102a, 102b are not limited to arcs; they may assume other shapes.

(8) Modification 6

Figure 20:
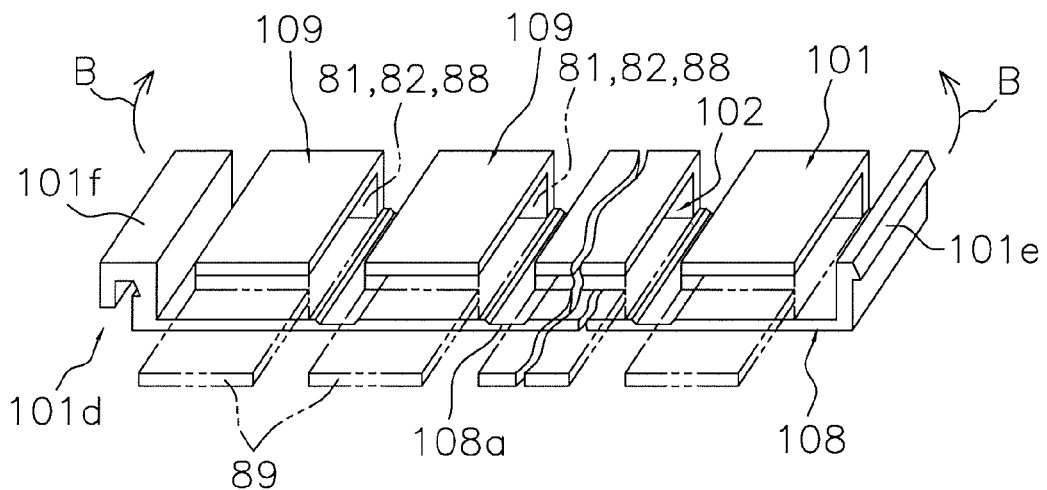
FIG. 20 is a perspective view of a casing constituting a fluid sensor in Modification 6.
Figure 21:
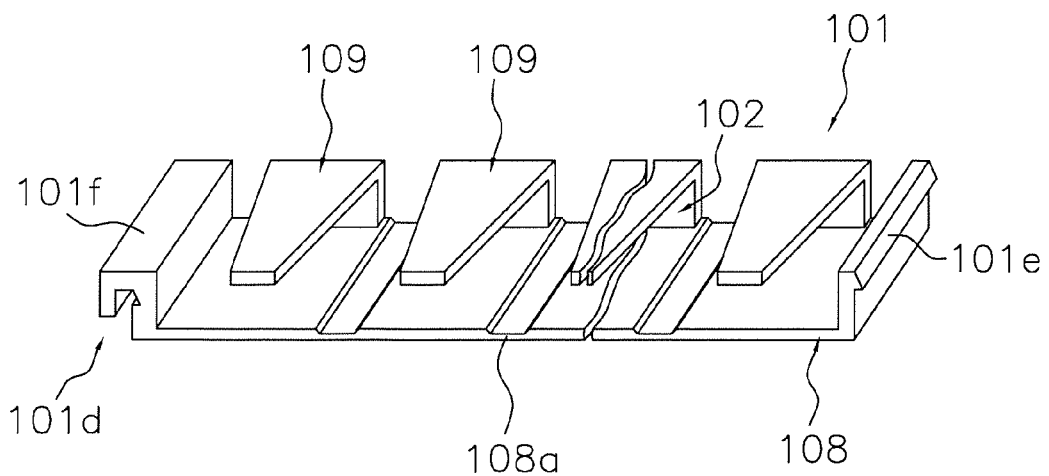
FIG. 21 is a perspective view of a casing constituting a fluid sensor in Modification 6.
Figure 22:
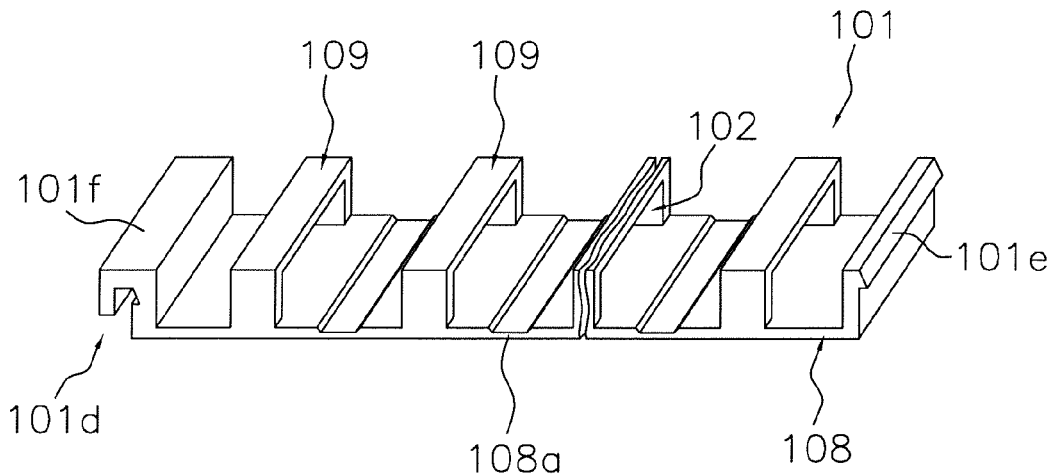
FIG. 22 is a perspective view of a casing constituting a fluid sensor in Modification 6.

In Modification 5 described above, a refrigerant pipe constituting the refrigerant circuit 10 was wound using the casing 101 having two columnar parts 101a, 101b whose transverse cross sections were crescent shapes, but another option is a structure such as the one shown in FIGS. 20 to 22 having a casing 101 made of a synthetic resin, which has primarily a belt-shaped part 108 substantially shaped as a belt, and a plurality of space-forming parts 109 formed into L shapes and U shapes in the longitudinal direction of the belt-shaped part 108; wherein a plurality of accommodating parts 102 for covering a fluid holder 88 and electrodes 81, 82 is formed by the plurality of space-forming parts 109 and the belt-shaped part 108, fluid-guiding members 89 are made to protrude from the short direction of the belt-shaped part 108, and the belt-shaped part 108 is bent in the directions of the arrows B to wind up the pipe constituting the refrigerant circuit 10.

In the present modification, similar to Modification 5, the precision of refrigerant leakage detection can be further improved because fluids and the like other than the refrigerant or the specified fluid resulting from refrigerant leakage are prevented to the fullest extent possible from being held in the fluid holder 88, and the refrigerant or the specified fluid resulting from refrigerant leakage can be led into the casing 101 and held and accumulated in the fluid holder 88. Moreover, essentially in the structure of Modification 5, the fluid sensor 8 must be prepared according to the diameter of the refrigerant pipe, but in the structure of the present modification, the belt-shaped part 108 is attached by being wound over the refrigerant pipe, and it is therefore possible to more flexibly adapt to the size of the diameter of the refrigerant pipe than in the structure of Modification 5. The operability of winding the belt-shaped part 108 over the refrigerant pipe can also be improved by forming a thin part 108a having less thickness in the belt-shaped part 108, as shown in FIGS. 20 to 22. In the present modification, similar to Modification 5, latching parts 101d composed of pawls 101e, 101f or the like may be provided to both longitudinal ends of the belt-shaped part 108, and the casing 101 may be detachably latched to a pipe or pipe joint constituting the refrigerant circuit 10.

(9) Modification 7

In the embodiment and its Modifications 1 through 6 described above, fluid sensors 8 are respectively placed on or in proximity to the pipe joint connecting the first shutoff valve 26 and the first refrigerant communication pipe 5, on or in proximity to the pipe joint connecting the second shutoff valve 27 and the second refrigerant communication pipe 6, on or in proximity to the pipe joint connecting the utilization unit 4 and the first refrigerant communication pipe 5, and on or in proximity to the pipe joint connecting the utilization unit 4 and the second refrigerant communication pipe 6 as shown in FIG. 1, but other possibilities for fluid sensor 8 locations in addition to these areas include refrigerant circuit structural components, such as pressure sensors and capillary tubes.

Figure 23:
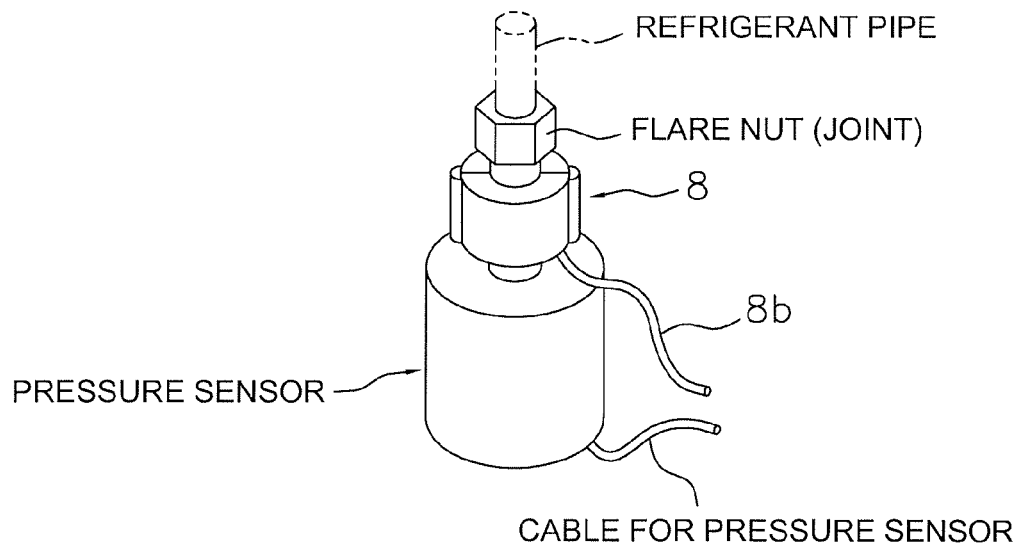
FIG. 23 is a perspective view showing a pressure sensor to which a fluid sensor has been attached in advance.
Figure 24:
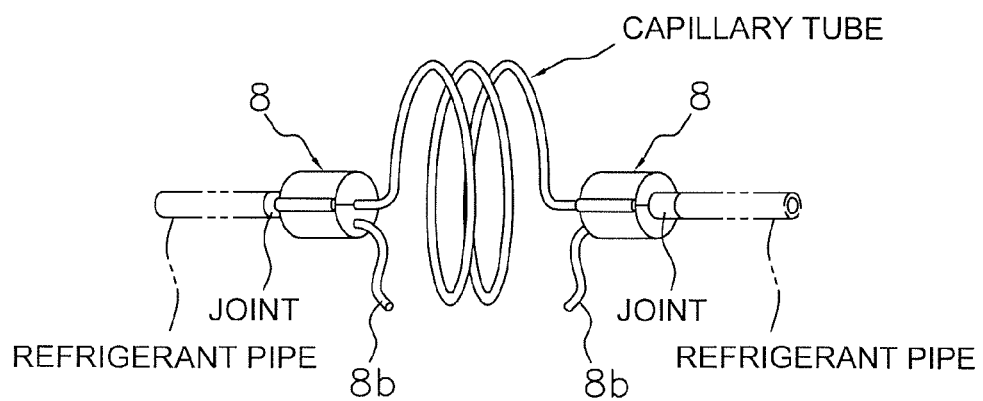
FIG. 24 is a perspective view showing a capillary tube to which a fluid sensor has been attached in advance.

In this case, in areas where refrigerant leakage is highly likely, such as the joints between pressure sensors and refrigerant pipes or the joints between capillary tubes and refrigerant pipes; pressure sensors, capillary tubes, or other refrigerant circuit structural components provided with fluid sensors 8 may be prepared in advance in proximity to the joints with each of the refrigerant pipes, and the fluid sensors 8 may be placed on the refrigerant circuit 10 at the same time that the pressure sensors, capillary tubes, or other refrigerant circuit structural components are attached to the refrigerant circuit 10 as shown in FIGS. 23 and 24, rather than being placed after the pressure sensors or capillary tubes have been attached to the refrigerant circuit 10.

Discrepancy in the operation of attaching the fluid sensors 8 is thereby less likely, and detection precision can be improved in comparison with cases in which the fluid sensors 8 are attached after the pressure sensors or capillary tubes have been attached to the refrigerant circuit 10.

(10) Modification 8

Figure 25:
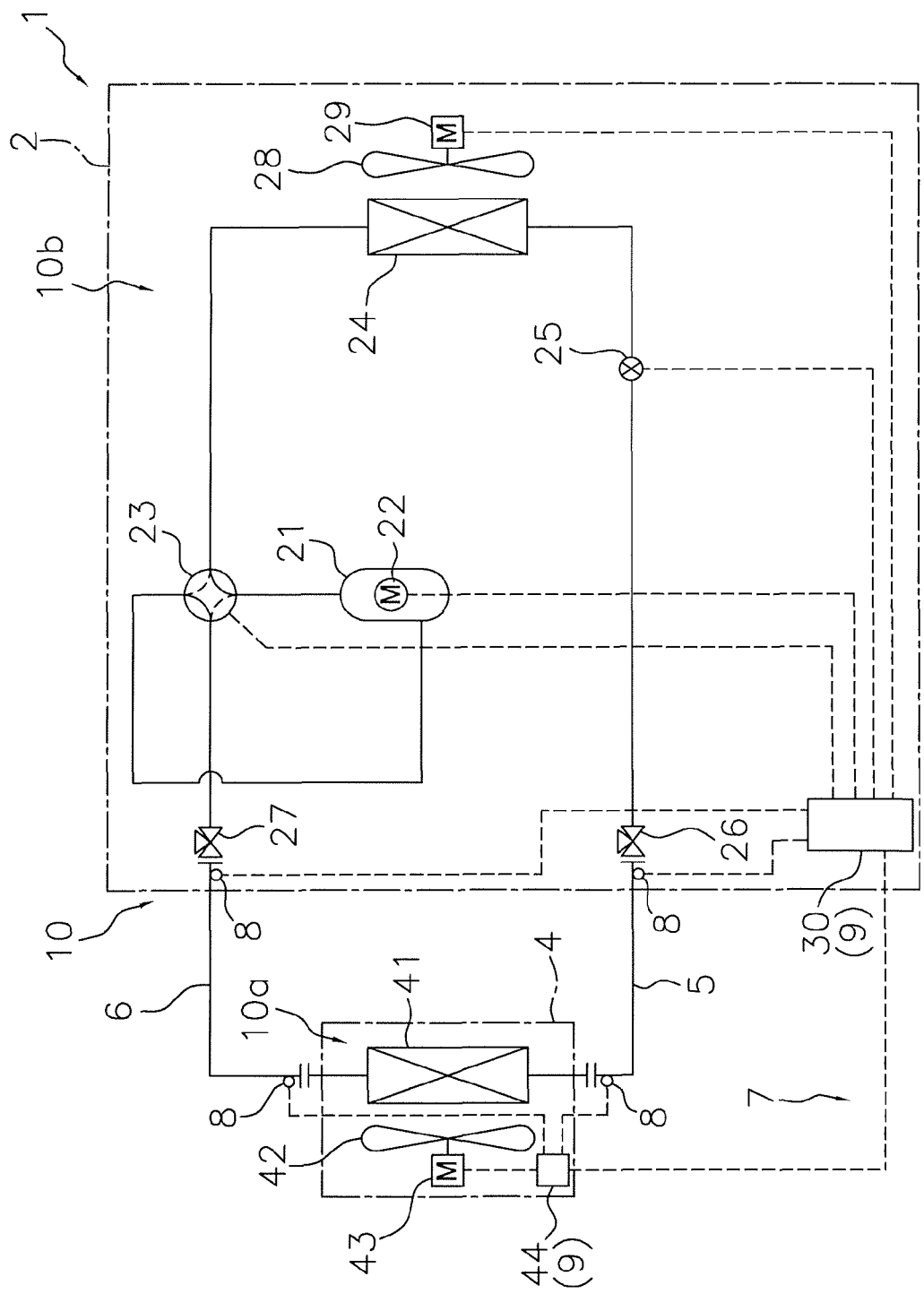
FIG. 25 is a schematic structural diagram of an air-conditioning apparatus according to Modification 8.
Figure 26:
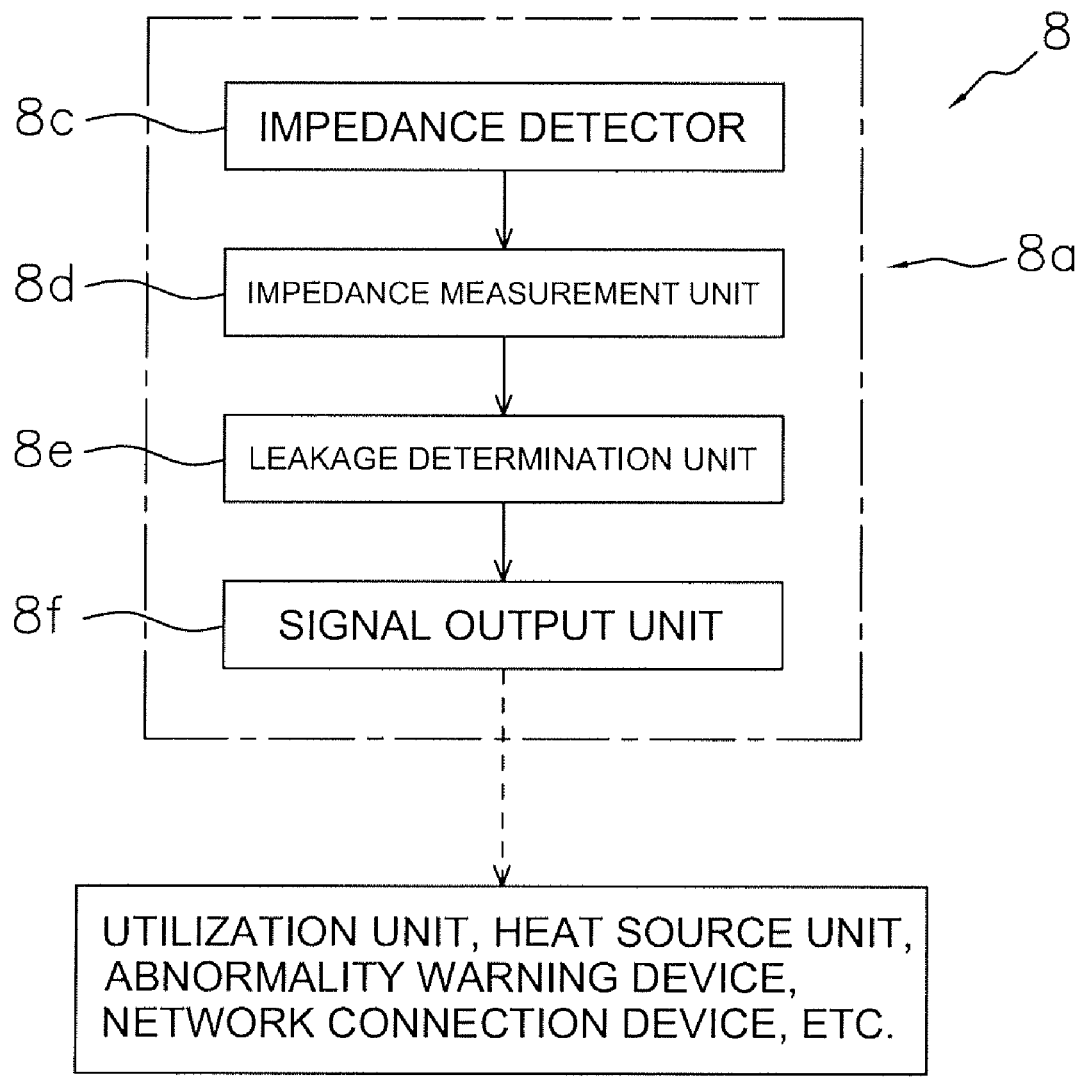
FIG. 26 is a block diagram showing the configuration of a fluid sensor in Modification 9.

In the embodiment and its Modifications 1 through 7 described above, the fluid sensors 8 alone are provided to the air-conditioning apparatus 1 and the fluid sensors 8 are connected to the impedance measurement device 9 when refrigerant leakage detection is performed as shown in FIGS. 1 and 5, but another possible option is to provide impedance measurement device 9 (i.e., the impedance measurement circuit such as those shown in FIGS. 6 and 7) connected to the fluid sensors 8 to controllers 7 (i.e., the utilization-side controller 44 or the heat source-side controller 30), as shown in FIG. 25.

Thereby, since the air-conditioning apparatus 1 of the present modification includes impedance measurement device 9 connected to the fluid sensors 8, there is no longer a need to connect the impedance measurement device 9 to the fluid sensors 8 when performing refrigerant leakage detection. Processes such as storing the results of refrigerant leakage detection in the utilization-side controller 44 or heat source-side controller 30 can also be easily performed, therefore contributing to improving the precision of refrigerant leakage detection. Furthermore, refrigerant leakage detection can be performed constantly.

(11) Modification 9

In the embodiment and its Modifications 1 through 7 described above, since the fluid sensors 8 are connected to external impedance measurement device 9 (see FIG. 5), there arises a need to perform an operation of connecting the impedance measurement device 9 to the fluid sensors 8 when refrigerant leakage detection is performed. It is also difficult to apply Modification 8 to an existing air-conditioning apparatus or other refrigeration apparatus that does not have a function for detecting refrigerant leakage.

In view of this, in the present modification, each of the sensor main bodies 8a of the fluid sensors 8 is configured to have an impedance detector 8c for detecting changes in impedance in the electrodes 81, 82 or the like in the embodiment and its Modifications 1 through 7 described above, an impedance measurement unit 8d having the function of the impedance measurement device 9 for measuring the impedance between the two electrodes 81, 82, a leakage determination unit 8e for making a determination pertaining to refrigerant leakage on the basis of the impedance value measured by the impedance determination unit 8d (more specifically, by comparing with a threshold), and a signal output unit 8f for outputting to an external device the conclusion result pertaining to refrigerant leakage obtained by the leakage determination unit 8e. The external device could be the utilization unit 4, the heat source unit 2, an abnormality warning device, a network connection device, or the like; and, depending on these external devices, an electric current or voltage analog signal or the like can be outputted through wires, a radio wave signal or the like can be outputted wirelessly, or another measure can be used.

In the present modification, unlike the embodiment and its Modifications 1 through 7 described above, there is no longer a need to connect the impedance measurement device 9 to the fluid sensors 8 when refrigerant leakage detection is performed. The precision of refrigerant leakage detection can also be improved because the distance between the impedance detector 8c and the impedance measurement unit 8d of the electrodes 81, 82 or the like is shorter than in cases of connecting to external impedance measurement device 9 or cases of providing impedance measurement device 9 to an air-conditioning apparatus or refrigeration apparatus such as the one in Modification 8 described above. Furthermore, since the leakage determination unit 8e and the signal output unit 8f are included, the input terminal of a controller of an existing air-conditioning apparatus or other refrigeration apparatus can be used, whereby refrigerant leakage detection is made possible merely by custom installing the fluid sensors 8 even with an existing air-conditioning apparatus or other refrigeration apparatus that does not have a function for detecting refrigerant leakage.

(12) Modification 10

In the embodiment and its Modifications 1 through 9 described above, the fluid sensors 8 are placed in or in proximity to portions in the refrigerant circuit 10 where refrigerant leakage is highly likely, and it is possible using these fluid sensors 8 to detect refrigerant leakage from the refrigerant circuit 10 of the air-conditioning apparatus 1 while pinpointing the location in the refrigerant circuit 10 where the refrigerant leakage is occurring.

However, besides the refrigerant or the fluid resulting from refrigerant leakage, other possible causes for changes in the impedance (or electrostatic capacitance) of the fluid sensors 8 include humidity (i.e., water vapor), temperature, and changes over time. Therefore, if only one such fluid sensor 8 is provided in or in proximity to each portion in the refrigerant circuit 10 where refrigerant leakage detection is performed, there is a possibility that there will also be effects from causes of changes in electrostatic capacitance based on causes of changes in electrostatic capacitance other than the refrigerant or the fluid resulting from refrigerant leakage.

In view of this, the present modification uses a refrigerant leakage detection device 207 wherein the fluid sensor of the embodiment and its Modifications 1 through 7 described above is a first sensor 208 in which the refrigerant or fluid resulting from refrigerant leakage is held between two electrodes 81, 82, two fluid sensors constituting a second sensor 209 in which the refrigerant or fluid resulting from refrigerant leakage is not held between the two electrodes 81, 82 are included separately from the first sensor 208, the change in electrostatic capacitance caused by the refrigerant or fluid resulting from refrigerant leakage is calculated from a first difference between the output of the first sensor 208 and the output of the second sensor 209, and refrigerant leakage is detected via this change in electrostatic capacitance. The refrigerant leakage detection device 207 according to the present modification is described hereinbelow using FIGS. 27 and 28.

The refrigerant leakage detection device 207 according to the present modification comprises primarily the first sensor 208, the second sensor 209, a first oscillation circuit 213, a second oscillation circuit 214, an up/down counting circuit 215, a resetting circuit 216, a calculation unit 211, and a detection unit 212.

The first sensor 208 and the second sensor 209 are placed on or in proximity to a pipe joint of the refrigerant circuit 10, similar to the fluid sensor in the embodiment and its modifications described above. The first sensor 208 and the second sensor 209 used in the present modification have the same plate-shaped structure (see FIG. 4) as the fluid sensor in the embodiment described above. Specifically, the first sensor 208 and the second sensor 209 both have two electrodes 81, 82 spaced apart from each other. The electrodes 81, 82 are both plate-shaped members made of an electroconductive material, and are maintained as being spaced apart from each other by a spacer member 83 made of an electrically insulative material in the present embodiment. The first sensor 208 is covered by a film 87, similar to the fluid sensor 8 in the embodiment described above, and part of the wiring extending from the first sensor 208 is secured to the refrigerant pipe by a securing member 86 composed of a band, adhesive tape, or the like. The second sensor 209 is placed in proximity to the first sensor 208, but is not covered by the film 87 covering the first sensor 208. Thereby, in cases in which the refrigerant or fluid resulting from refrigerant leakage is refrigerator oil, as in Modification 1 described above, for example, the refrigerator oil resulting from refrigerant leakage is held between the two electrodes 81, 82 of the first sensor 208, but the refrigerator oil resulting from refrigerant leakage is not held between the two electrodes 81, 82 of the second sensor 209. Specifically, the first sensor 208 and the second sensor 209 are both affected by humidity and other causes of changes in electrostatic capacitance, but the second sensor 209 is not affected by causes of changes in electrostatic capacitance from the refrigerant or refrigerator oil as a fluid resulting from refrigerant leakage, while the first sensor 208 is affected by causes of changes in electrostatic capacitance from the refrigerant or refrigerator oil as a fluid resulting from refrigerant leakage. The structure of the first sensor 208 and the second sensor 209 is not limited to the flat plate-shaped structure in the embodiment described above, and the structure of the fluid sensor in Modifications 1 through 7 described above (see FIGS. 8 through 24) may be used.

The first oscillation circuit 213 is connected to the first sensor 208, and the second oscillation circuit 214 is connected to the second sensor 209. The first oscillation circuit 213 oscillates at a frequency corresponding to the electrostatic capacitance Cx of the first sensor 208. The second oscillation circuit 214 oscillates at a frequency corresponding to the electrostatic capacitance Cn of the second sensor 209. Specifically, the first oscillation circuit 213 oscillates at a frequency corresponding to the electrostatic capacitance Cx of the first sensor 208, which changes due to the effects of both the refrigerant or fluid resulting from refrigerant leakage (refrigerator oil in this case) and other causes of changes in electrostatic capacitance, and the first oscillation circuit 213 outputs a first oscillation signal OS1. The second oscillation circuit 214 oscillates at a frequency corresponding to the electrostatic capacitance Cn of the second sensor 209, which changes due to the effects of causes of changes in electrostatic capacitance other than the refrigerant or fluid resulting from refrigerant leakage (refrigerator oil in this case), and the second oscillation circuit 214 outputs a second oscillation signal OS2. The first oscillation circuit 213 and the second oscillation circuit 214 can be CR oscillation circuits configured primarily from the electrostatic capacitance and resistance of each of the sensors, or LC back-coupling oscillation circuits configured primarily from coils and the electrostatic capacitance of each of the sensors.

The up/down counting circuit 215 has two input terminals, and each of the input terminals are connected to an output terminal of the first oscillation circuit 213 and an output terminal of the second oscillation circuit 214. The up/down counting circuit 215 counts up the output of the first oscillation circuit 213 (i.e., the first oscillation signal OS1) which oscillates at a frequency corresponding to the electrostatic capacitance Cx of the first sensor 208, and counts down the output of the second oscillation circuit 214 (i.e., the second oscillation signal OS2) which oscillates at a frequency corresponding to the electrostatic capacitance Cn of the second sensor 209. The up/down counting circuit 215 repeats this operation at predetermined intervals. The up/down counting circuit thereby counts a number of pulses equivalent to the difference between the frequency of the first oscillation signal OS1, which is based on the first sensor 208 affected by both the refrigerant or the fluid resulting from refrigerant leakage (refrigerator oil in this case) and other causes of changes in electrostatic capacitance, and the frequency of the second oscillation signal OS2, which is based on the second sensor 209 affected only by causes of changes in electrostatic capacitance other than the refrigerant or the fluid resulting from refrigerant leakage (refrigerator oil in this case).

The output terminal of the resetting circuit 216 is connected to a resetting terminal of the up/down counting circuit 215. At predetermined cycles, the resetting circuit 216 resets a count value according to the up/down counting circuit 215. The predetermined cycles are determined in advance based on experimentation, the naturally included electrostatic capacitance in the first sensor 208 and second sensor 209 independent of the causes of changes in electrostatic capacitance, or other factors, for example.

Having been reset by the resetting circuit 216, the up/down counting circuit 215 initializes the count value that has been counted up to this point and begins to count up and count down from the beginning.

The calculation unit 211 is connected to the output terminal of the up/down counting circuit 215. Since the number of pulses counted up until the resetting by the up/down counting circuit 215 is equivalent to the difference between the frequencies of the first and second oscillation signals OS1, OS2, the calculation unit 211 computes a first difference between the output of the first sensor 208 and the output of the second sensor 209 on the basis of the counted value according to the up/down counting circuit 215. Based on this first difference, the calculation unit 211 then calculates the change in electrostatic capacitance caused by the refrigerant or the fluid resulting from refrigerant leakage (refrigerator oil in this case), and outputs the calculated result to the detection unit 212. The calculation unit 211 may be configured from a calculation circuit, or from a microcomputer composed of memory and a CPU.

The detection unit 212 detects refrigerant leakage on the basis of the change in electrostatic capacitance calculated by the calculation unit 211. Specifically, if the calculation result from the calculation unit 211 is "0," the detection unit 212 determines that refrigerant leakage has not occurred. If the calculation result by the calculation unit 211 is not "0," the detection unit 212 determines that refrigerant leakage has occurred and computes the amount of leaked refrigerant on the basis of the calculation result. Though the details are not illustrated, the detection result from the detection unit 212 is sent to the controller 7 and is used in the controlling of the utilization unit 4 and the heat source unit 2. Similar to the calculation unit 211, the detection unit 212 may be configured from a detection circuit or from a microcomputer composed of memory and a CPU, as long as it is capable of detecting refrigerant leakage.

In this type of refrigerant leakage detection device 207 according to the present modification, the up/down counting circuit 215 counts up a signal that oscillates according to the electrostatic capacitance Cx of the first sensor 208, and counts down a signal that oscillates according to the electrostatic capacitance Cn of the second sensor 209. Since the value counted by the up/down counting circuit 215 is a pulse number equivalent to the difference between the frequency corresponding to the electrostatic capacitance Cx of the first sensor 208 and the frequency corresponding to the electrostatic capacitance Cn of the second sensor 209, the calculation unit 211 can calculate the first difference from the counted value. Furthermore, the calculation unit 211 can accurately single out the change in electrostatic capacitance caused by the refrigerant or the fluid resulting from refrigerant leakage (refrigerator oil in this case) by calculating the change in electrostatic capacitance on the basis of the first difference, and the detection unit 212 can therefore detect refrigerant leakage with greater accuracy.

In the refrigerant leakage detection device 207 of the present modification, the value counted by the up/down counting circuit 215 is reset in predetermined cycles by the resetting circuit 216. Therefore, the calculation unit 211 can calculate the first difference between the output of the first sensor 208 and the output of the second sensor 209 from the counted value before it is reset.

The up/down counting circuit 215 in the refrigerant leakage detection device 207 of the present modification may be configured so as to carry over when the counted result reaches a desired value. With this configuration, the calculation unit 211 is still capable of computing the first difference in the same manner as described above.

(13) Modification 11

Figure 29:
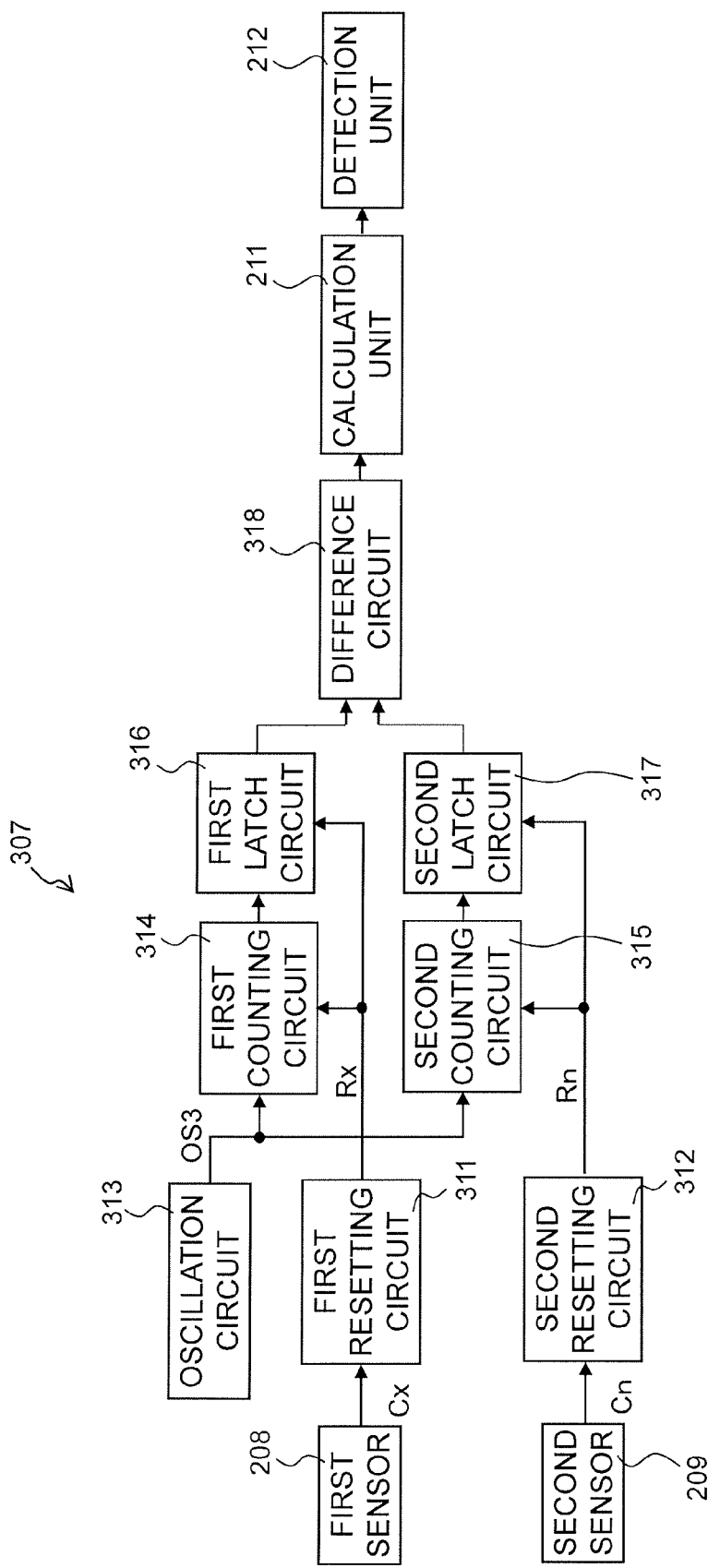
FIG. 29 is a diagram showing the configuration of a refrigerant leakage detection device in Modification 11.

A configuration such as that of a refrigerant leakage detection device 307 shown in FIG. 29 may be used as a refrigerant leakage detection device which uses the first sensor 208 and the second sensor 209 as in Modification 10 described above.

The refrigerant leakage detection device 307 according to the present modification comprises primarily a first sensor 208, a second sensor 209, a first resetting circuit 311, a second resetting circuit 312, an oscillation circuit 313, a first counting circuit 314, a second counting circuit 315, a first latch circuit 316, a second latch circuit 317, a difference circuit 318 (equivalent to a difference calculation unit), a calculation unit 211, and a detection unit 212. The first sensor 208, the second sensor 209, and the detection unit 212 are the same as the first sensor 208, the second sensor 209, and the detection unit 212 in Modification 10 described above and are therefore not described herein.

The first resetting circuit 311 is connected to the first sensor 208, and the second resetting circuit 312 is connected to the second sensor 209. The output terminal of the first resetting circuit 311 is connected to each of the resetting terminals of the first counting circuit 314 and first latch circuit 316. The output terminal of the second resetting circuit 312 is connected to each of the resetting terminals of the second counting circuit 315 and second latch circuit 317.

This type of first resetting circuit 311 outputs a first reset signal Rx, which is based on a time constant determined according to the electrostatic capacitance Cx of the first sensor 208, to the first counting circuit 314 and the first latch circuit 316. The second resetting circuit 312 outputs a second reset signal Rn, which is based on a time constant determined according to the electrostatic capacitance Cn of the second sensor 209, to the second counting circuit 315 and the second latch circuit 317. More specifically, the first resetting circuit 311 outputs the first reset signal Rx for resetting the first counting circuit 314 and the first latch circuit 316 in accordance with the electrostatic capacitance Cx changed by both the refrigerant or the fluid resulting from refrigerant leakage (refrigerator oil in this case) and another cause of a change in electrostatic capacitance. The second resetting circuit 312 outputs a second reset signal Rn for resetting the second counting circuit 315 and the second latch circuit 317 in accordance with the electrostatic capacitance Cn changed by only another cause of a change in electrostatic capacitance other than the refrigerant or the fluid resulting from refrigerant leakage (refrigerator oil in this case). In other words, based on the electrostatic capacitances Cx, Cn of each of the sensors 208, 209, each of the resetting circuits 311, 312 can determine time durations for holding signals inputted by each of the latch circuits 316, 317. Based on the electrostatic capacitances Cx, Cn of each of the sensors 208, 209, each of the resetting circuits 311, 312 can also determine time durations for resetting the counted values of each of the counting circuits 314, 315. Each of the resetting circuits 311, 312 according to the present modification outputs each of the reset signals Rx, Rn in synchronization with a reference clock. Specifically, each of the resetting circuits 311, 312 at every predetermined timing calculates time constants on the basis of the occasional electrostatic capacitances Cx, Cn of each of the sensors 208, 209 and outputs the reset signals Rx, Rn based on the calculated time constants.

Figure 30:
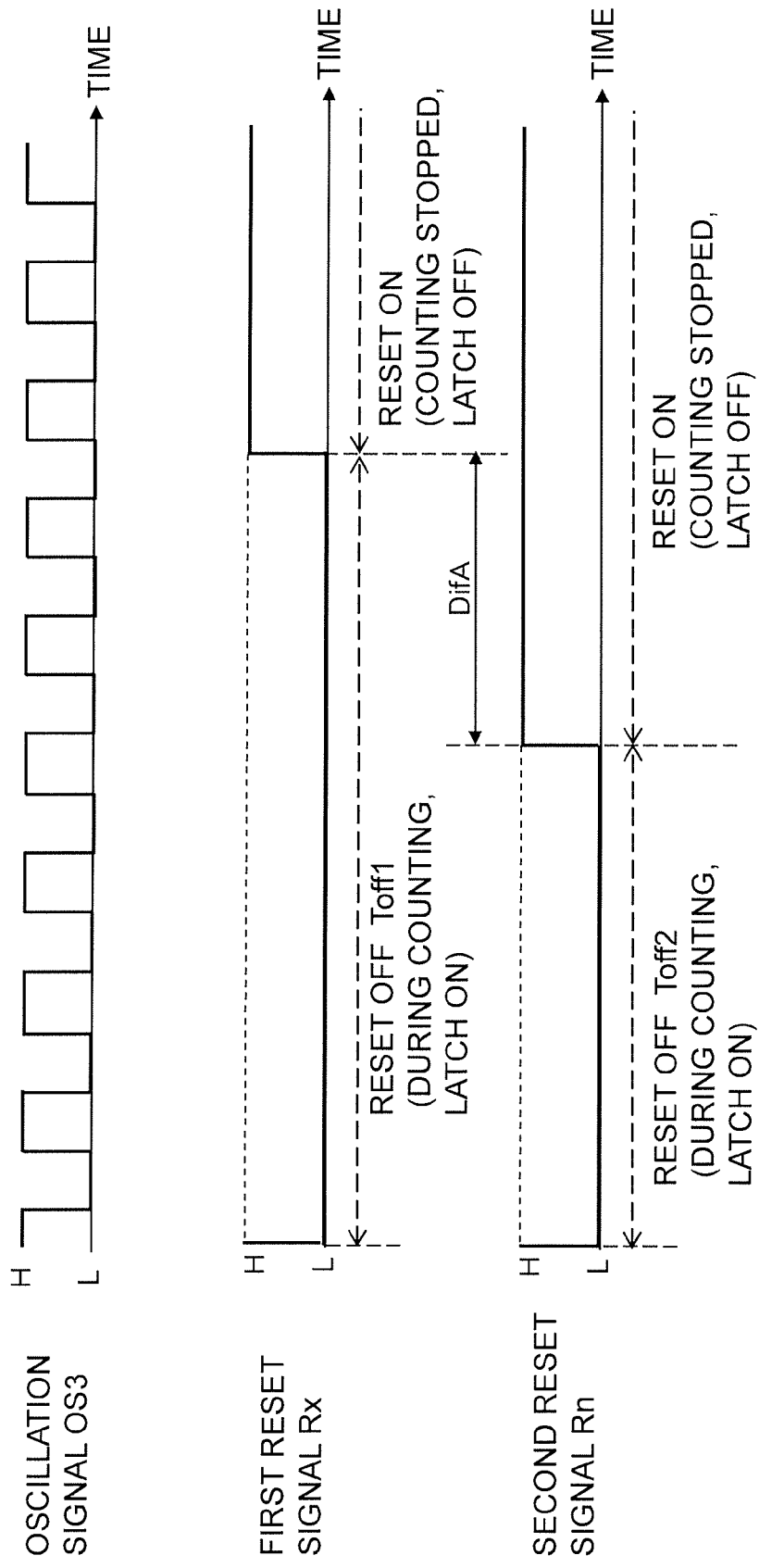
FIG. 30 is a timing chart of an oscillation signal, a first reset signal, and a second reset signal.

The output terminal of the oscillation circuit 313 is connected to the input terminals of the first counting circuit 314 and the second counting circuit 315, and an oscillation signal OS3 (equivalent to a pulse signal) is outputted to the counting circuits 314, 315. The oscillation signal OS3 is a pulse-form signal having a predetermined frequency as shown in FIG. 30. The predetermined frequency of the oscillation signal OS3 is determined in advance through experimentation or the like, irrespective of the electrostatic capacitance Cx of the first sensor 208 or the electrostatic capacitance Cn of the second sensor 209.

The first counting circuit 314 counts the number of pulses of the oscillation signal OS3 and stops the counting of the oscillation signal OS3 on the basis of the first reset signal Rx. The second counting circuit 315 counts the number of pulses of the oscillation signal OS3 and stops the counting of the oscillation signal OS3 on the basis of the second reset signal Rn. To describe in detail using FIG. 30, the first counting circuit 314 counts the oscillation signal OS3 while the first reset signal Rx is at "L" indicating that resetting is off (the time period Toff1 in FIG. 30), and the first counting circuit 314 stops counting the oscillation signal OS3 when the first reset signal Rx switches to "H" indicating that resetting is on. Similar to the first counting circuit 314, the second counting circuit 315 also counts the oscillation signal OS3 if the second reset signal Rn is at "L" and stops counting the oscillation signal OS3 if the second reset signal Rn is at "H."

The length of the time period Toff1 during which reset off "L" is outputted as the first reset signal Rx is different from the length of the time period Toff2 during which reset off "L" is outputted as the second reset signal Rn, as shown in FIG. 30. This is because each of the reset signals Rx, Rn is determined based on the electrostatic capacitances Cx, Cn of each of the sensors 208, 209 as described above. Specifically, since the time constants used to determine each of the reset signals Rx, Rn are proportionate to the electrostatic capacitances Cx, Cn of each of the sensors 208, 209, the difference DifA between the length of the time period Toff1 during which reset off "L" is outputted as the first reset signal Rx and the length of the time period Toff2 during which reset off "L" is outputted as the second reset signal Rn can be said to be equivalent to the difference between the electrostatic capacitances Cx, Cn of each of the sensors 208, 209. Particularly, in FIG. 30, the time period Toff1 during which reset off "L" is outputted as the first reset signal Rx is longer than the time period Toff2 during which reset off "L" is outputted as the second reset signal Rn. This is because the electrostatic capacitance Cx of the first sensor 208 is changed by both the refrigerant or fluid resulting from refrigerant leakage (refrigerator oil in this case) and another cause of a change in electrostatic capacitance, whereas the electrostatic capacitance Cn of the second sensor 209 is changed based on only another cause of a change in electrostatic capacitance other than the refrigerant or the fluid resulting from refrigerant leakage (refrigerator oil in this case). The time period Toff1 of the first reset signal Rx is longer than the time period Toff2 of the second reset signal Rn by an amount proportionate to the change caused by adsorption of the refrigerator oil.

The first latch circuit 316 connects through its input terminal to the output terminal of the first counting circuit 314, and holds the counted value of the first counting circuit 314. The second latch circuit 317 connects through its input terminal to the output terminal of the second counting circuit 315, and holds the counted value of the second counting circuit 315. The first reset signal Rx is inputted to the first latch circuit 316, and the second reset signal Rn is inputted to the second latch circuit 317 as described above. Therefore, each of the latch circuits 316, 317 continues to hold the counted values while each of the reset signals Rx, Rn is at reset off "L." When each of the reset signals Rx, Rn switches to reset on "H," each of the latch circuits 316, 317 resets each of the counted values being held up to that point.

The difference circuit 318 has two input terminals, and each of these input terminals is connected to the output terminal of the first latch circuit 316 and the output terminal of the second latch circuit 317. The difference circuit 318 calculates a second difference between the counted numbers counted by the first counting circuit 314 and the second counting circuit 315 respectively until the counting of the oscillation signal OS3 was stopped. Since the values counted by each of the counting circuits 314, 315 correlate with the lengths of the time periods Toff1, Toff2 during which each of the reset signals Rx, Rn is at reset off "L," the second difference between the counted value of the first counting circuit 314 and the counted value of the second counting circuit 315 as calculated by the difference circuit 318 can be said to be equivalent to the difference DifA between each of the lengths of the time periods Toff1, Toff2, or to the change in electrostatic capacitance caused by only the refrigerant or the fluid resulting from refrigerant leakage (refrigerator oil in this case).

The calculation unit 211 is connected to the output terminal of the difference circuit 318. The calculation unit 211 calculates the first difference between the output of the first sensor 208 and the output of the second sensor 209 on the basis of the second difference calculated by the difference circuit 318. The calculation unit 211 then calculates the change in electrostatic capacitance caused by only the refrigerant or the fluid resulting from refrigerant leakage (refrigerator oil in this case) on the basis of the first difference, and outputs the calculated result to the detection unit 212. The calculation unit 211 may be configured from a calculation circuit or from a microcomputer composed of memory and a CPU, similar to Modification 10 described above.

In this type of refrigerant leakage detection device 307 according to the present modification, the first counting circuit 314 counts the oscillation signal OS3 until resetting is instructed by the first reset signal Rx, and the second counting circuit 315 counts the oscillation signal OS3 until resetting is instructed by the second reset signal Rn. The first reset signal Rx and the second reset signal Rn are, respectively, a signal based on a time constant determined by the electrostatic capacitance Cx of the first sensor 208 and a signal based on a time constant determined by the electrostatic capacitance Cn of the second sensor 209, and therefore the timings whereby the first counting circuit 314 and the second counting circuit 315 stop counting are therefore different. In other words, the difference between the counted numbers of each of the counting circuits 314, 315 is equivalent to the difference between the electrostatic capacitances Cx, Cn of each of the sensors 208, 209. The refrigerant leakage detection device 307 therefore can calculate the first difference from the second difference of each of the counted numbers. Consequently, it is possible to accurately single out the change in electrostatic capacitance caused by the refrigerant or the fluid resulting from refrigerant leakage (refrigerator oil in this case), and refrigerant leakage can be detected with greater accuracy.

(14) Modification 12

Figure 31:
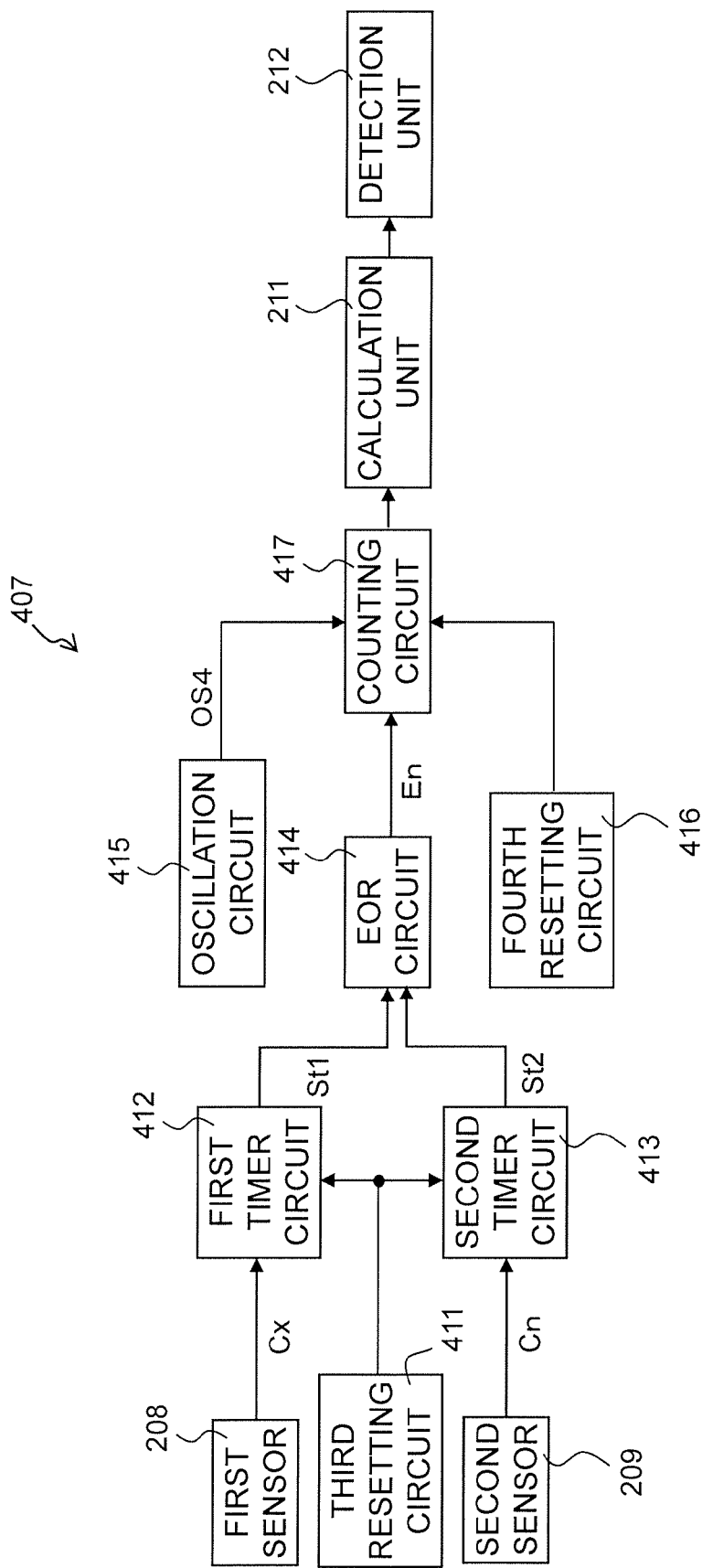
FIG. 31 is a diagram showing the configuration of a refrigerant leakage detection device in Modification 12.

A configuration such as a refrigerant leakage detection device 407 shown in FIG. 31 may be used as a refrigerant leakage detection device that uses the first sensor 208 and the second sensor 209, such as those shown in Modifications 10 and 11 described above.

The refrigerant leakage detection device 407 according to the present modification comprises primarily a first sensor 208, a second sensor 209, a third resetting circuit 411, a first timer circuit 412, a second timer circuit 413, an EOR circuit 414, an oscillation circuit 415, a fourth resetting circuit 416, a counting circuit 417 (the EOR circuit 414 and counting circuit 417 are equivalent to a time calculation unit), a calculation unit 211, and a detection unit 212. The first sensor 208, the second sensor 209, and the detection unit 212 are the same as the first sensor 208, the second sensor 209, and the detection unit 212 of Modification 10 described above and are therefore not described herein.

The output terminal of the third resetting circuit 411 is connected to each of the resetting terminals of the first timer circuit 412 and the second timer circuit 413. The third resetting circuit 411 generates a signal for resetting each of the timer circuits 412, 413 and outputs the signal to each of the timer circuits 412, 413.

The input terminal of the first timer circuit 412 is connected to the first sensor 208, and the input terminal of the second timer circuit 413 is connected to the second sensor 209.

Figure 32:
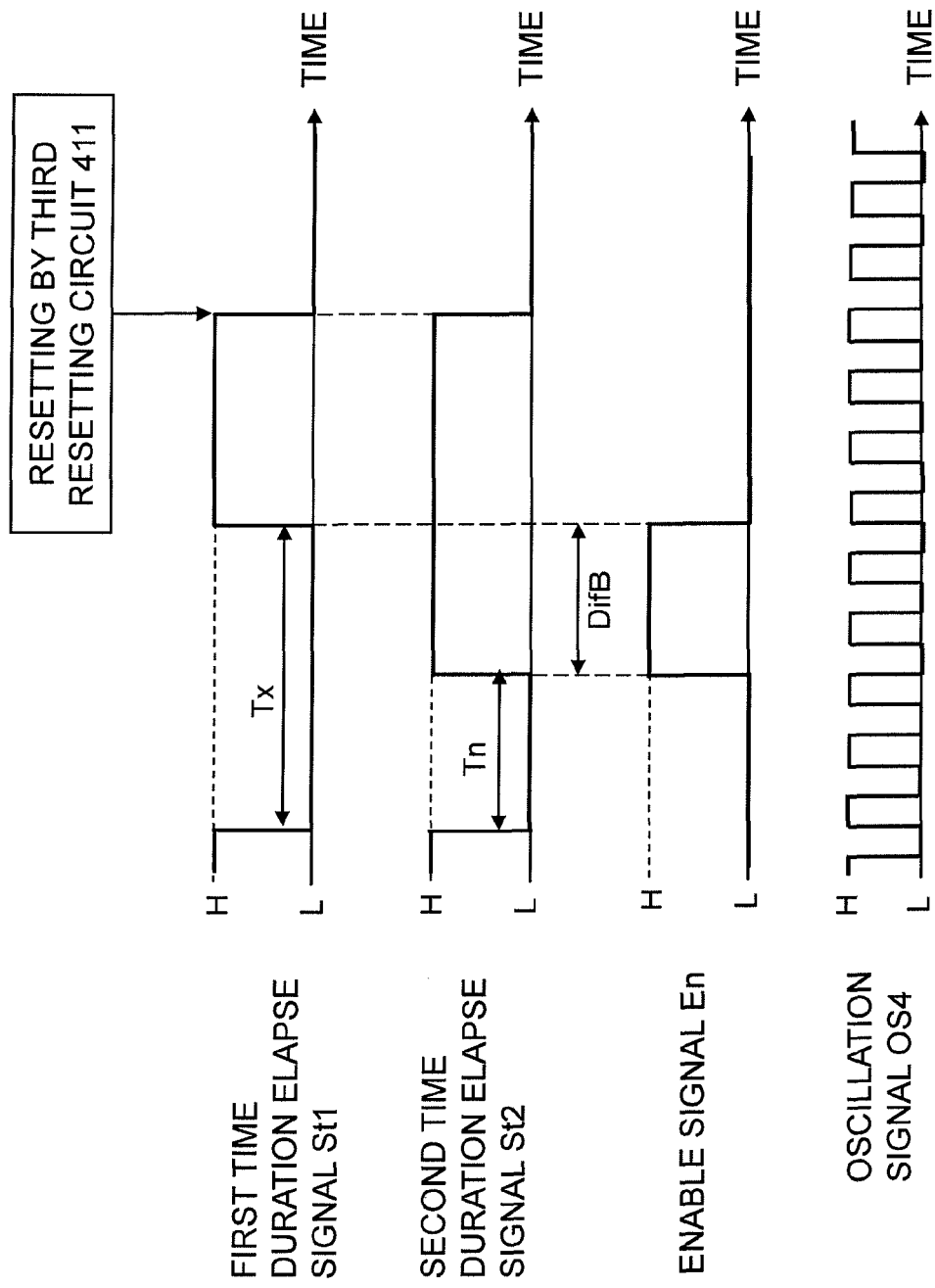
FIG. 32 is a timing chart of a first time duration elapse signal, a second time duration elapse signal, an enable signal, and an oscillation signal.

The first timer circuit 412 first determines a time duration Tx in accordance with the electrostatic capacitance Cx of the first sensor 208, which is changed by both the refrigerant or the fluid resulting from refrigerant leakage (refrigerator oil in this case) and another cause of changes in electrostatic capacitance, as shown in FIG. 32. After the first timer circuit 412 has been once reset by the third resetting circuit 411, the first timer circuit 412 begins to measure the time duration. When the measured time duration reaches the time duration Tx, the first timer circuit 412 outputs a first time duration elapse signal St1 indicating the same. The second timer circuit 413 first determines a time duration Tn in accordance with the electrostatic capacitance Cn of the second sensor 209, which is changed by only a cause of changes in electrostatic capacitance other than the refrigerant or the fluid resulting from refrigerant leakage (refrigerator oil in this case), and after the second timer circuit 413 has been once reset by the third resetting circuit 411, the second timer circuit 413 begins to measure the time duration. When the measured time reaches the time duration Tn, the second timer circuit 413 outputs a second time duration elapse signal St2 indicating the same.

The logic of the first time duration elapse signal SU according to the present modification is that the signal is "L" when the time duration measured by the first timer circuit 412 has not reached the time duration Tx, and the signal is "H" when the time duration Tx has elapsed. Similarly, the logic of the second time duration elapse signal St2 is that the signal is "L" when the time duration measured by the second timer circuit 413 has not reached the time duration Tn, and the signal is "H" when the time duration Tn has elapsed. Each of the time duration elapse signals St1, St2 (both "H") indicating that the time durations Tx, Tn have elapsed are continually outputted until each of the timer circuits 412, 413 are reset by the third resetting circuit 411.

Possible examples of the method for determining the above-described time durations Tx, Tn include a first method for determining by multiplying the electrostatic capacitances Cx, Cn by a predetermined coefficient, and a second method for determining by time constants based on the electrostatic capacitances Cx, Cn, similar to Modification 11 described above, but the first method is used in the present modification. Thus, the above-described time durations Tx, Tn are determined by the electrostatic capacitances Cx, Cn, thereby causing a deviation according to the values of the electrostatic capacitances Cx, Cn in the timings at which the first time duration elapse signal St1 "H" indicating that the time duration Tx has elapsed and the second time duration elapse signal St2 "H" indicating that the time duration Tn has elapsed begin to be outputted respectively. In other words, the difference DifB corresponds to the difference between the electrostatic capacitances Cx, Cn, the difference DifB being the difference between the timing at which the time duration Tx elapses and the first time duration elapse signal St1 "H" begins to be outputted and the timing at which the time duration Tn elapses and the second time duration elapse signal St2 "H" begins to be outputted. Particularly, the time duration Tx during which the first time duration elapse signal St1 is "L" is longer than the time duration Tn during which the second time duration elapse signal St2 is "L." This is because the electrostatic capacitance Cn of the second sensor 209 changes based on only causes of changes in electrostatic capacitance other than the refrigerant or the fluid resulting from refrigerant leakage (refrigerator oil in this case), whereas the electrostatic capacitance Cx of the first sensor 208 changes not only due to causes of changes in electrostatic capacitance other than the refrigerant or the fluid resulting from refrigerant leakage (refrigerator oil in this case), but due to the refrigerant or the fluid resulting from refrigerant leakage (refrigerator oil in this case) as well. In other words, the difference DifB between the timings at which each of the time duration elapse signals St1, St2 "H" begin to be outputted is equivalent to the change in electrostatic capacitance caused by the refrigerant or the fluid resulting from refrigerant leakage (refrigerator oil in this case).

The EOR circuit 414 has two input terminals, and the output terminals of each of the timer circuits 412, 413 are connected to each of these input terminals. The EOR circuit 414 is a so-called exclusive OR circuit, which outputs "H" as an enable signal En in cases in which either the first time duration elapse signal St1 or the second time duration elapse signal St2 outputted from each of the first and second timer circuits 412, 413 is "H," as shown in FIG. 32. Specifically, the EOR circuit 414 detects cases in which the time duration Tx based on the electrostatic capacitance Cx has elapsed but the time duration Tn based on the electrostatic capacitance Cn has not elapsed. The EOR circuit 414 outputs "L" as the enable signal En when the first time duration elapse signal St1 and the second time duration elapse signal St2 are both "L" or "H."

The output terminal of the oscillation circuit 415 is connected to an oscillation signal input terminal of the counting circuit 417. The oscillation circuit 415 outputs an oscillation signal OS4 to the counting circuit 417. The oscillation signal OS4 is a pulse-form signal having a predetermined frequency, as shown in FIG. 32. The predetermined frequency of the oscillation signal OS4, similar to the oscillation signal OS3 according to Modification 11 described above, is determined in advance through experimentation or another method, irrespective of the electrostatic capacitance Cx of the first sensor 208 or the electrostatic capacitance Cn of the second sensor 209.

The output terminal of the fourth resetting circuit 416 is connected to a resetting terminal of the counting circuit 417. The fourth resetting circuit 416 generates a signal for resetting the counting circuit 417 and outputs the signal to the counting circuit 417.

The output terminal of the EOR circuit 414 is connected to another input terminal of the counting circuit 417 separate from the oscillation signal input terminal. The counting circuit 417 counts the number of pulses of the oscillation signal OS4 only during the time period DifB in which the enable signal En is "H." The pulse number counted by the counting circuit 417 is thereby a value corresponding to the length of the time period DifB.

When a signal for resetting is inputted from the fourth resetting circuit 416, the counting circuit 417 resets the counted value up to that point.

The calculation unit 211 is connected to an output terminal of the counting circuit 417. The calculation unit 211 calculates the first difference between the output of the first sensor 208 and the output of the second sensor 209 on the basis of the pulse number counted by the counting circuit 417. The calculation unit 211 is capable of calculating a first difference because the pulse number counted by the counting circuit 417 is a value corresponding to the length of the time period DifB and the length of the time period DifB corresponds to the difference between the electrostatic capacitances Cx, Cn of each of the sensors 208, 209. The calculation unit 211 then calculates the change in electrostatic capacitance caused by the refrigerant or the fluid resulting from refrigerant leakage (refrigerator oil in this case) on the basis of the first difference, and outputs the calculated result to the detection unit 212.

The calculation unit 211 may be configured from a calculation circuit, or from a microcomputer composed of memory and a CPU, similar to Modifications 10 and 11 described above.

In this type of refrigerant leakage detection device 407 according to the present modification, when the electrostatic capacitances Cx, Cn of each of the sensors 208, 209 are different, the time durations Tx, Tn determined by the electrostatic capacitances Cx, Cn of each of the sensors 208, 209 are also different, and the timings whereby "H" begins to be outputted are therefore also different for the first time duration elapse signal St1 and the second time duration elapse signal St2. In view of this, the refrigerant leakage detection device 407 according to the present modification calculates the first difference on the basis of the length of the time period DifB during which either one of the first time duration elapse signal St1 and second time duration elapse signal St2 is "H," i.e., on the basis of the difference between the timing at which "H" begins to be outputted for the first time duration elapse signal St1 and the timing at which "H" begins to be outputted for the second time duration elapse signal St2. In other words, since the length of the above-described time period DifB is equivalent to the change in electrostatic capacitance caused by the refrigerant or the fluid resulting from refrigerant leakage (refrigerator oil in this case), it is possible to accurately single out the change in electrostatic capacitance caused by refrigerator oil adsorption, and refrigerant leakage can be detected with greater accuracy.

(15) Modification 13

Figure 33:
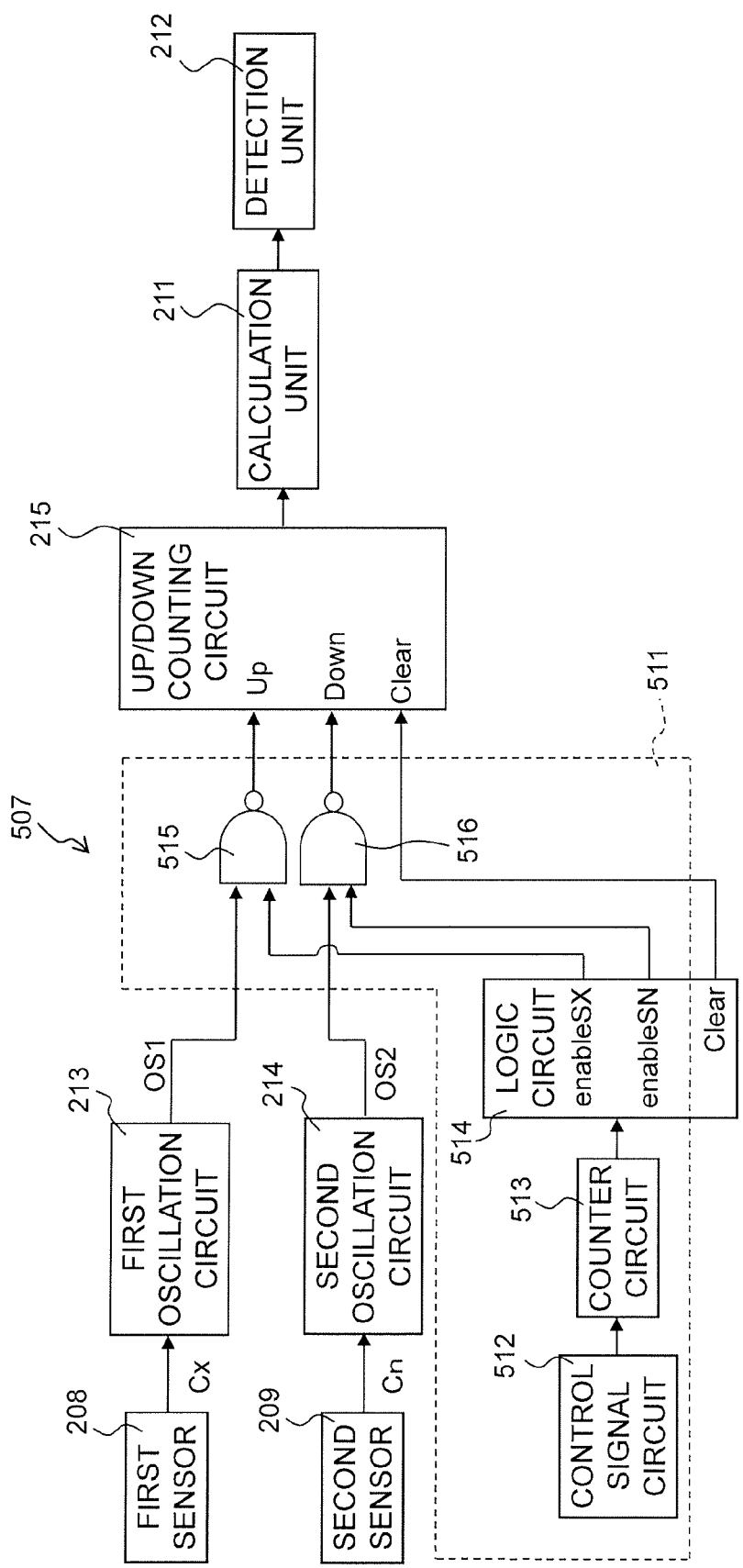
FIG. 33 is a diagram showing the configuration of a refrigerant leakage detection device in Modification 13.

A configuration such as a refrigerant leakage detection device 507 shown in FIG. 33 may also be used as a refrigerant leakage detection device that uses a first sensor 208 and second sensor 209 such as those in Modifications 10 to 12 described above.

The refrigerant leakage detection device 507 according to the present modification differs from the refrigerant leakage detection device 207 according to Modification 10 by having a selection circuit 511 instead of the resetting circuit 216. Specifically, the refrigerant leakage detection device 507 comprises primarily a first sensor 208, a second sensor 209, a first oscillation circuit 213, a second oscillation circuit 214, a selection circuit 511, an up/down counting circuit 215, a calculation unit 211, and a detection unit 212. The first sensor 208, the second sensor 209, the first oscillation circuit 213, the second oscillation circuit 214, the up/down counting circuit 215, the calculation unit 211, and the detection unit 212 are the same as the first sensor 208, the second sensor 209, the first oscillation circuit 213, the second oscillation circuit 214, the up/down counting circuit 215, the calculation unit 211, and the detection unit 212 in Modification 10 described above, and are therefore not described herein.

The selection circuit 511 is a circuit for selecting either the output of the first oscillation circuit 213 (i.e., the first oscillation signal OS1) or the output of the second oscillation circuit 214 (i.e., the second oscillation signal OS2) and inputting its selection to the up/down counting circuit 215. More specifically, the selection circuit 511 has a control signal circuit 512, a counter circuit 513, a logic circuit 514 having output terminals for enable signals SX, SN, and two NAND circuits 515, 516.

The control signal circuit 512 generates a clock signal having a predetermined duty and frequency, and outputs this signal to the counter circuit 513. The duty and frequency of the signal outputted by the selection circuit 511 are determined in advance by the electrostatic capacitances originally included in the first oscillation circuit 213 and second oscillation circuit 214 independent of the causes of changes in electrostatic capacitance. The signal outputted by the control signal circuit 512 is counted in the counter circuit 513 and then sent to the logic circuit 514. The logic circuit 514 generates two enable signals SX, SN such as those shown in FIG. 34 from the counting result of the counter circuit 513. The enable signals SX, SN are both signals having the logic "H" or "L," and the enable signal SX and enable signal SN have exclusive logic. For example, when the enable signal SX has the logic "H," the enable signal SN has the logic "L." The enable signal SX is inputted to one of two input terminals of the NAND circuit 515, and the enable signal SN is inputted to one of two input terminals of the NAND circuit 516. The first oscillation signal OS1 is inputted to the other input terminal of the NAND circuit 515, and the second oscillation signal OS2 is inputted to the other input terminal of the NAND circuit 516.

Figure 34:
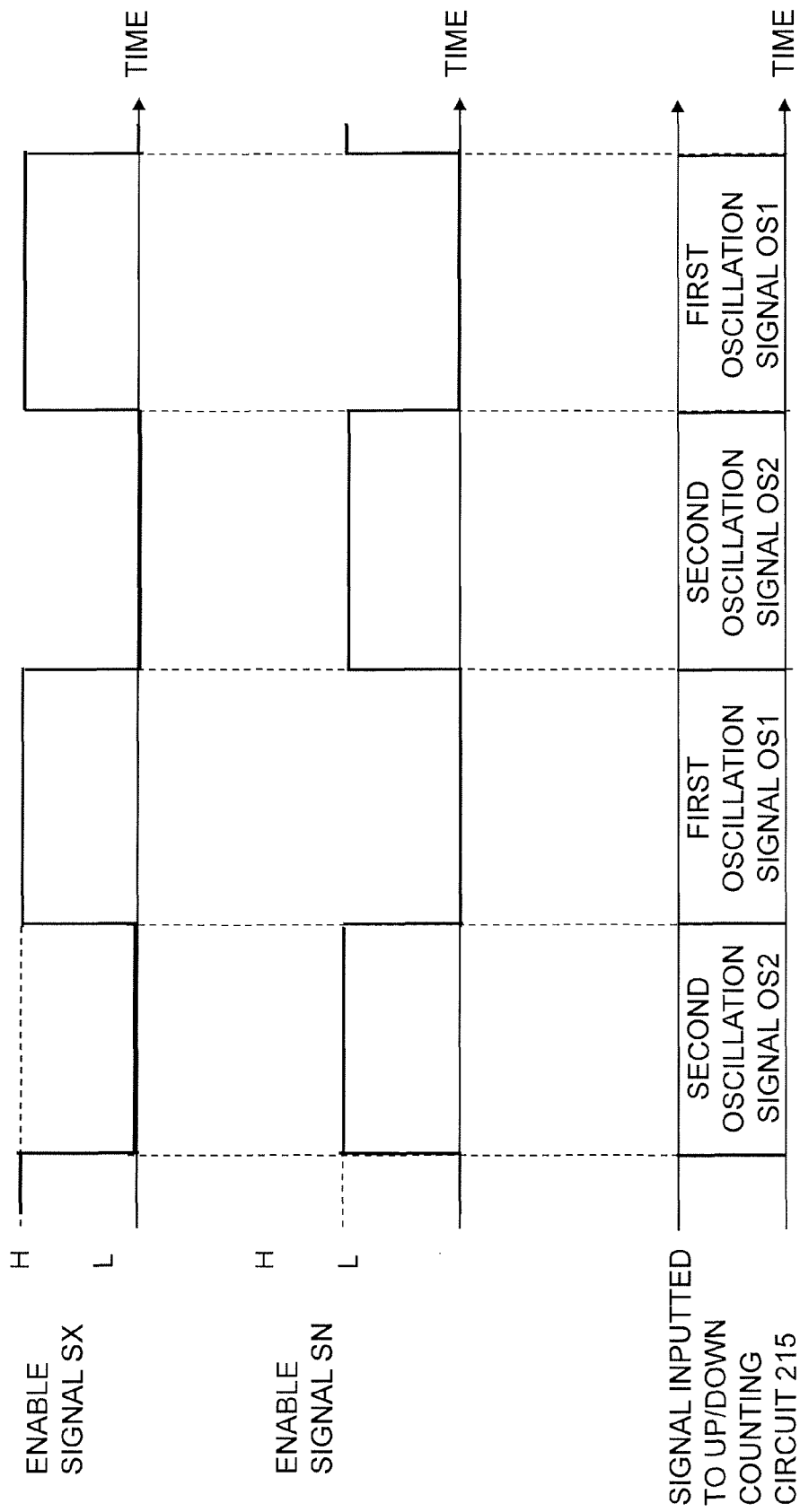
FIG. 34 is a timing chart showing enable signals and a signal inputted to an up/down counting circuit.

The NAND circuit 515 described above outputs the first oscillation signal OS1 when the logic of the enable signal SX is "H," and the NAND circuit 516 outputs the second oscillation signal OS2 when the logic of the enable signal SN is "H." Since the enable signal SX and the enable signal SN never both have the logic "H" but instead alternatively have the logic "H," either the first oscillation signal OS1 or the second oscillation signal OS2 is inputted to the up/down counting circuit 215 (see FIG. 34). In other words, rather than the first oscillation signal OS1 and the second oscillation signal OS2 being inputted simultaneously to the up/down counting circuit 215, either the first oscillation signal OS1 or the second oscillation signal OS2 selected by the selection circuit 511 is inputted. The up/down counting circuit 215 can, thereby, reliably perform the operation of counting up the first oscillation signal OS1 and counting down the second oscillation signal OS2. Consequently, an accurate counted value is outputted from the up/down counting circuit 215 to the calculation unit 211, and the calculation unit 211 can reliably calculate the first difference, based on the counted value, between the output of the first sensor 208 and the output of the second sensor 209, and can also reliably calculate the change in electrostatic capacitance based on the first difference and caused by the refrigerant or the fluid resulting from refrigerant leakage (refrigerator oil in this case) as a cause of changes in electrostatic capacitance. The change in electrostatic capacitance calculated in this manner by the calculation unit 211 is outputted to the detection unit 212.

Furthermore, in addition to output terminals for the enable signals SX, SN, the logic circuit 514 in the present modification also has an output terminal for a reset signal Clear (the portion of the logic circuit 514 having the output terminal for the reset signal Clear is equivalent to a resetting unit). The reset signal Clear has the role of resetting the value counted by the up/down counting circuit 215 at predetermined cycles. The predetermined cycles are determined in advance based on factors such as the electrostatic capacitance originally included in the first sensor 208 and the second sensor 209 independent of causes of changes in electrostatic capacitance, similar to the clock signal outputted by the control signal circuit 512. Having been reset by the reset signal Clear, the up/down counting circuit 215 initializes the values counted up to that point and begins to count up and down from the beginning.

In the refrigerant leakage detection device 507 according to the present modification, since either the first oscillation signal OS1 or the second oscillation signal OS2 is inputted to the up/down counting circuit 215, the first oscillation signal OS1 and the second oscillation signal OS2 are not simultaneously inputted to the up/down counting circuit 215. Consequently, the up/down counting circuit 215 can reliably perform the operation of counting up the first oscillation signal OS1 and counting down the second oscillation signal OS2, and accurate counted values for calculating the first difference can be obtained.

According to the refrigerant leakage detection device 507 of the present modification, the values counted by the up/down counting circuit 215 are reset in predetermined cycles by the reset signal Clear outputted from the logic circuit 514. Therefore, the calculation unit 211 is capable of calculating the first difference between the output of the first sensor 208 and the output of the second sensor 209 by the counted values before resetting.

(16) Other Embodiments

An embodiment and modifications of the present invention were described above based on the drawings, but the specific configuration is not limited to the embodiment and its modifications, and changes can be made within a range that does not deviate from the scope of the invention.

(A) In the embodiment and its modifications described above, the present invention was described using as an example a so-called paired air-conditioning apparatus 1 in which one utilization unit 4 is connected to one heat source unit 2, but the present invention may also be applied to a so-called multi-type air-conditioning apparatus 1 in which a plurality of utilization units are connected to one heat source unit. In this case, branching parts corresponding to the number of utilization units are formed in the refrigerant communication pipes, and fluid sensors 8 may therefore be provided to pipe joints or other components in these branching parts.

(B) In the embodiment and its modifications described above, the present invention was described using as an example an air-conditioning apparatus 1 capable of operating while switching between cooling and heating, but the present invention may also be applied to a cooling-only apparatus, a heating-and-cooling apparatus, a heat storage air conditioner, and various other air-conditioning apparatuses. Moreover, the present invention is not limited to an air-conditioning apparatus, and can also be applied to a refrigeration apparatus that has a refrigerant circuit and is susceptible to refrigerant leakage, such as a heat-pump type water heater.

Figure 27:
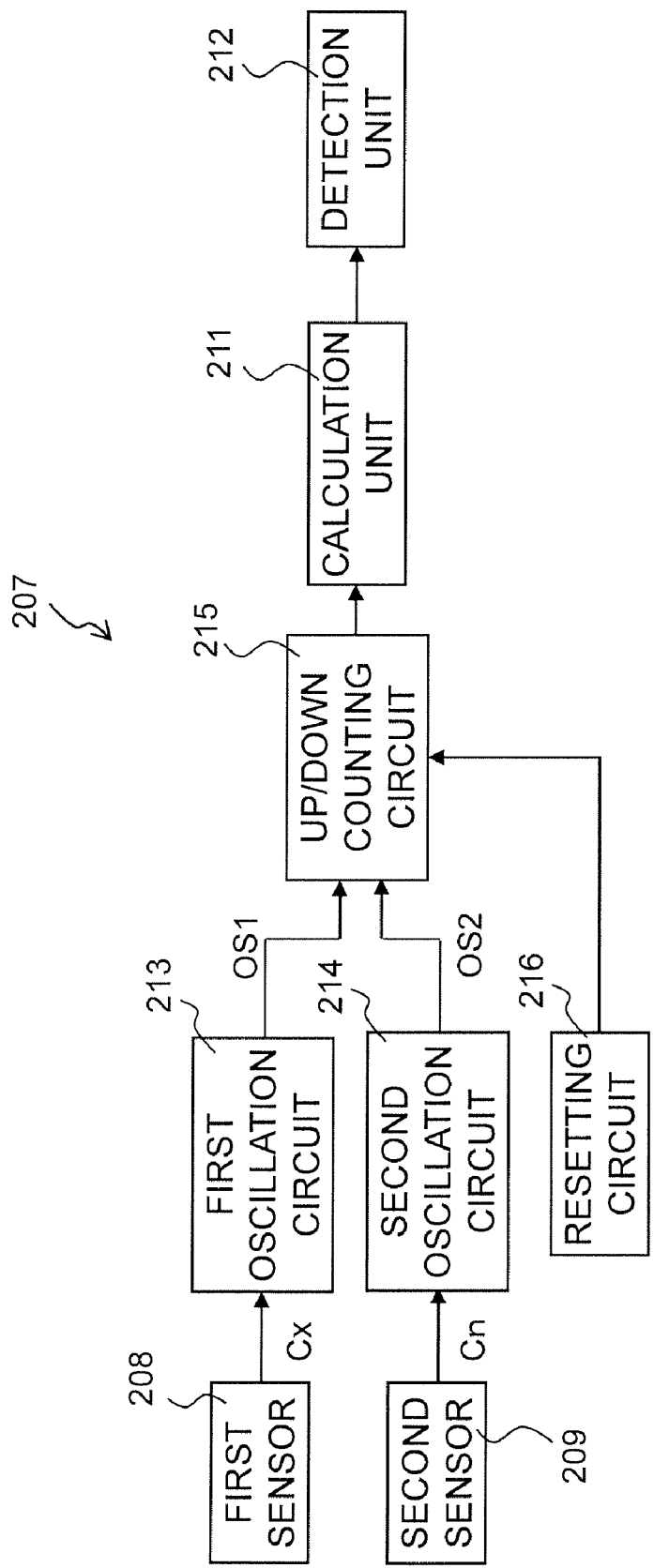
FIG. 27 is a diagram showing the configuration of a refrigerant leakage detection device in Modification 10.
Figure 28:
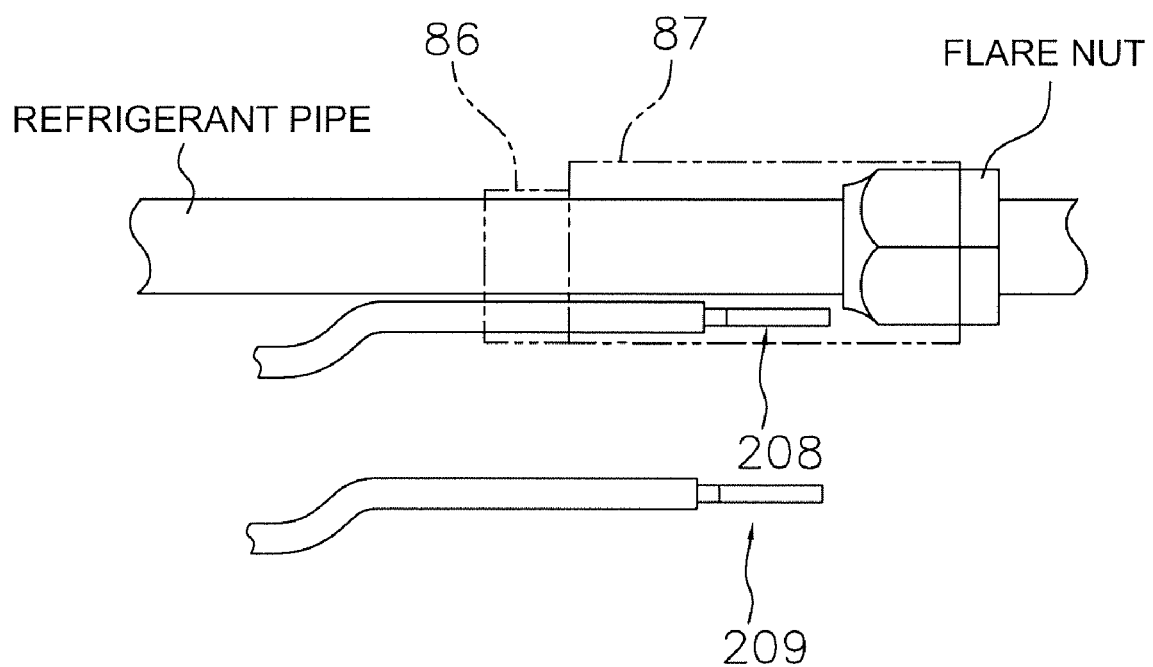
FIG. 28 is a drawing showing a first sensor and a second sensor placed in proximity to a refrigerant pipe.

(C) In Modifications 10 and 13 described above, instead of providing the calculation unit 211 and the detection unit 212 of FIG. 27 separately, a determination circuit may be provided in which the calculation unit 211 and the detection unit 212 are integrated. In this case, the determination circuit compares the value counted by the up/down counting circuit 215 with a threshold and determines whether or not refrigerant has leaked according to the comparison result. Even with this configuration, the counted value is equivalent to the difference between the electrostatic capacitance Cx of the first sensor 208 and the electrostatic capacitance Cn of the second sensor 209, i.e., to the change in electrostatic capacitance caused by the refrigerant or the fluid resulting from refrigerant leakage, and it is therefore possible to accurately single out the change in electrostatic capacitance caused by the refrigerant or the fluid resulting from refrigerant leakage.

(D) In Modification 11 described above, instead of providing the calculation unit 211 and the detection unit 212 of FIG. 29 separately, a determination circuit may be provided in which the calculation unit 211 and the detection unit 212 are integrated. In this case, the determination circuit compares the second difference calculated by the difference circuit 318 with a threshold and determines whether or not refrigerant has leaked according to the comparison result. Even with this configuration, the second difference is equivalent to the difference between the electrostatic capacitance Cx of the first sensor 208 and the electrostatic capacitance Cn of the second sensor 209, i.e., to the change in electrostatic capacitance caused by the refrigerant or the fluid resulting from refrigerant leakage, and it is therefore possible to accurately single out the change in electrostatic capacitance caused by the refrigerant or the fluid resulting from refrigerant leakage.

(E) In Modification 12 described above, instead of providing the calculation unit 211 and the detection unit 212 of FIG. 31 separately, a determination circuit may be provided in which the calculation unit 211 and the detection unit 212 are integrated. In this case, the determination circuit compares the pulse number counted by the counting circuit 417 with a threshold and determines whether or not refrigerant has leaked according to the comparison result. Even with this configuration, the pulse number is equivalent to the difference between the electrostatic capacitance Cx of the first sensor 208 and the electrostatic capacitance Cn of the second sensor 209, i.e., to the change in electrostatic capacitance caused by the refrigerant or the fluid resulting from refrigerant leakage, and it is therefore possible to accurately single out the change in electrostatic capacitance caused by the refrigerant or the fluid resulting from refrigerant leakage.

(F) Furthermore, the configuration (various circuits, the calculation unit, and the detection unit) constituting the refrigerant leakage detection device according to Modifications 10 through 13 excluding the sensors 208, 209 may be incorporated into the controller 7, similar to Modification 8. The configuration (various circuits, the calculation unit, and the detection unit) constituting the refrigerant leakage detection device according to Modifications 10 through 13 excluding the sensors 208, 209 may also be configured integrally with the sensors 208, 209, similar to Modification 9.

Industrial Applicability

According to the present invention, it is possible to detect refrigerant leakage while pinpointing the location where the refrigerant leakage is occurring in a refrigerant circuit of a refrigeration system.

What is claimed is:

1. A fluid sensor for detecting refrigerant leakage from a refrigerant circuit of a refrigeration system, the fluid sensor comprising:
a sensor main body having two electrodes spaced apart from each other, the fluid sensor being configured such that the fluid sensor is connectable to an impedance measurement device to measure impedance between the two electrodes,
the sensor main body having a structure mountable so as to surround a pipe or pipe joint of the refrigerant circuit.

2. The fluid sensor according to claim 1, wherein the sensor main body has a fluid holder disposed between the two electrodes, and the fluid holder is configured to hold a refrigerant or a fluid resulting from refrigerant leakage.

3. The fluid sensor according to claim 2, wherein the fluid holder is paper.

4. The fluid sensor according to claim 1, wherein the two electrodes in the sensor main body have a multilayered structure.

5. The fluid sensor according to claim 1, wherein the sensor main body is provided with a latching part configured to detachably latch to the pipe or pipe joint of the refrigerant circuit.

6. The fluid sensor according to claim 1, wherein the sensor main body has a flat plate-shaped structure.

7. The fluid sensor according to claim 2, wherein the fluid holder and the electrodes are covered by a casing of the sensor main body; and
the sensor main body includes a fluid-guiding member configured to lead a refrigerant or a fluid resulting from refrigerant leakage between the two electrodes, and the fluid-guiding member protrudes from an interior of the casing to an exterior of the casing.

8. The fluid sensor according to claim 7, wherein
the casing includes an opening formed therein that is configured to allow the fluid-guiding member to protrude from the interior of casing to the exterior of casing; and
the opening has a smaller opening size than an accommodating part covering the fluid holder and the electrodes.

9. The fluid sensor according to claim 8, wherein
a gap between the opening and the fluid-guiding member is filled with a sealant in a state in which the fluid-guiding member protrudes from the opening.

10. A refrigeration system including the fluid sensor according to claim 1, the refrigerant system further comprising:
a refrigerant circuit, the fluid sensor being disposed in or in proximity to a portion of the refrigerant circuit where refrigerant leakage is detected.

11. The refrigeration system according to claim 10, further comprising
an impedance measurement device connected to the fluid sensor.

12. A fluid sensor for detecting refrigerant leakage from a refrigerant circuit of a refrigeration system, the fluid sensor comprising:
a sensor main body having two electrodes spaced apart from each other and a structure mountable so as to surround a pipe or pipe joint of the refrigerant circuit, the sensor main body further having
an impedance measurement unit configured to measure an impedance value between the two electrodes,
a leakage determination unit configured to determine whether or not refrigerant has leaked based on the impedance value measured by the impedance measurement unit, and
a signal output unit configured to output a result of the refrigerant leakage determination obtained by the leakage determination unit to an external device.

13. A refrigerant leakage detection device comprising:
sensor main body having two electrodes spaced apart from each other, the fluid sensor being configured such that the fluid sensor is connectable to an impedance measurement device to measure impedance between the two electrodes:
a second sensor having two electrodes spaced apart from each other, the second sensor being configured so that refrigerant or a fluid resulting from refrigerant leakage is not held between the two electrodes of the second sensor;
a calculation unit configured to calculate, based on a first difference between an output of the first sensor and an output of the second sensor, a change in electrostatic capacitance caused by the refrigerant or the fluid resulting from refrigerant leakage; and
a detection unit configured to determine whether or not refrigerant has leaked based on the change in electrostatic capacitance calculated by the calculation unit.

14. The refrigerant leakage detection device according to claim 13, further comprising:
a first oscillation unit configured to oscillate at a frequency corresponding toelectrostatic capacitance of the first sensor;
a second oscillation unit configured to oscillate at a frequency corresponding to electrostatic capacitance of the second sensor; and
an up/down counter configured to count up an output of the first oscillation unit and to count down an output of the second oscillation unit; wherein
the calculation unit is further configured to calculate the first difference on the basis of values counted by the up/down counter.

15. The refrigerant leakage detection device according to claim 14, further comprising:
a selection unit configured to select either the output of the first oscillation unit or the output of the second oscillation unit; wherein
either the output of the first oscillation unit or the output of the second oscillation unit selected by the selection unit is inputted to the up/down counter.

16. The refrigerant leakage detection device according to claim 14, further comprising
a resetting unit configured to reset counted values of the up/down counter in every predetermined cycle.

17. The refrigerant leakage detection device according to claim 13, further comprising:
a first resetting unit configured to output a first reset signal based on a time constant determined by the electrostatic capacitance of the first sensor;
a second resetting unit configured to output a second reset signal based on a time constant determined by the electrostatic capacitance of the second sensor;
a first counting unit configured to count a pulse signal having a predetermined frequency and to stop the counting of the pulse signal on the basis of the first reset signal;
a second counting unit configured to count the pulse signal and to stop the counting of the pulse signal on the basis of the second reset signal; and
a difference calculation unit configured to calculate a second difference between counted numbers counted by each of the first counting unit and the second counting unit until counting of the pulse signal is stopped; wherein
the calculation unit is further configured to calculate the first difference on the basis of the second difference.

18. The refrigerant leakage detection device according to claim 13, further comprising:
a first timer unit configured to output a first time duration elapse signal indicating that a time duration determined according to the electrostatic capacitance of the first sensor has elapsed;
a second timer unit configured to output a second time duration elapse signal indicating that a time duration determined according to the electrostatic capacitance of the second sensor has elapsed; and
an interval calculation unit configured to calculate a length of time during which either the first time duration elapse signal or the second time duration elapse signal is outputted from the first timer unit or the second timer unit; wherein
the calculation unit is further configured to calculate the first difference on the basis of the length of time calculated by the interval calculation unit.

19. A refrigeration system including the refrigerant leakage detection device according to claim 13, the refrigeration system further comprising:
a refrigerant circuit; and wherein
the refrigerant leakage detection device is configured to be disposed in or in proximity to a portion of the refrigerant circuit where refrigerant leakage detection is performed.

20. A refrigerant leakage detection method for detecting refrigerant leakage from a refrigerant circuit of a refrigeration system, the refrigerant leakage detection method comprising
providing a fluid sensor including a sensor main body having two electrodes spaced apart from each other and a structure mountable so as to surround a pipe or pipe joint of the refrigerant circuit, the fluid sensor being disposed in or in proximity to a portion of the refrigerant circuit where refrigerant leakage detection is performed; and
measuring impedance between the two electrodes with an impedance measurement device.

* * * * *